United States Patent
Fujita et al.

(10) Patent No.: US 9,624,435 B2
(45) Date of Patent: Apr. 18, 2017

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yukihiro Fujita, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/596,233

(22) Filed: Jan. 14, 2015

(65) Prior Publication Data

US 2015/0299576 A1 Oct. 22, 2015

(30) Foreign Application Priority Data

Apr. 18, 2014 (JP) ................................. 2014-086734

(51) Int. Cl.
| | | |
|---|---|---|
| *G02F 1/1333* | (2006.01) | |
| *C09K 19/34* | (2006.01) | |
| *C09K 19/30* | (2006.01) | |
| *C09K 19/54* | (2006.01) | |
| *C09K 19/04* | (2006.01) | |
| *C09K 19/12* | (2006.01) | |

(52) U.S. Cl.
CPC ...... *C09K 19/3402* (2013.01); *C09K 19/3066* (2013.01); *C09K 19/54* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3422* (2013.01); *C09K 2019/3425* (2013.01); *C09K 2019/546* (2013.01)

(58) Field of Classification Search
CPC C09K 19/3402; C09K 19/3066; C09K 19/54; C09K 2019/3422; C09K 2019/3425; C09K 2019/546; C09K 2019/0448; C09K 2019/122; C09K 2019/123; C09K 2019/3004; C09K 2019/3009; C09K 2019/301; C09K 2019/3016
USPC ............ 252/299.01, 299.6, 299.61; 349/182
See application file for complete search history.

(56) References Cited

U.S. PATENT DOCUMENTS

| | | | |
|---|---|---|---|
| 6,333,082 B1 * | 12/2001 | Duffy | .................. C07C 43/215 252/299.61 |
| 8,283,000 B2 * | 10/2012 | Matsumoto | ........ C09K 19/2007 252/299.01 |
| 2004/0011996 A1 | 1/2004 | Klasen-Memmer et al. | |
| 2005/0116200 A1 | 6/2005 | Nakanishi et al. | |
| 2005/0162576 A1 | 7/2005 | Sasaki et al. | |
| 2010/0304049 A1 | 12/2010 | Bernatz et al. | |
| 2010/0309423 A1 | 12/2010 | Bernatz et al. | |
| 2011/0311738 A1 * | 12/2011 | Nimura | .................. B29C 41/24 428/1.31 |
| 2013/0182202 A1 | 7/2013 | Graziano et al. | |

FOREIGN PATENT DOCUMENTS

| | | |
|---|---|---|
| EP | 1889894 | 2/2008 |
| JP | 2003-307720 | 10/2003 |
| JP | 2004-131704 | 4/2004 |
| JP | 2005-208309 | 8/2005 |
| JP | 2006-133619 | 5/2006 |
| JP | 4515102 | 7/2010 |
| JP | 2010-537010 | 12/2010 |
| JP | 2010-537256 | 12/2010 |
| WO | 2012/038026 | 3/2012 |

OTHER PUBLICATIONS

Li et al., "PI-Less Technology Development for Vertical Alignment TFT-LCD", International Display Workshop (IDW) '09, Dec. 2009, pp. 23-25, vol. 1.

* cited by examiner

*Primary Examiner* — Geraldina Visconti
(74) *Attorney, Agent, or Firm* — Jianq Chyun IP Office

(57) ABSTRACT

A liquid crystal composition is described, containing at least one compound selected from compounds of formula (1) and at least one compound selected from compounds of formula (2):

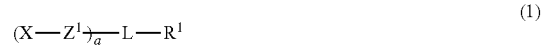

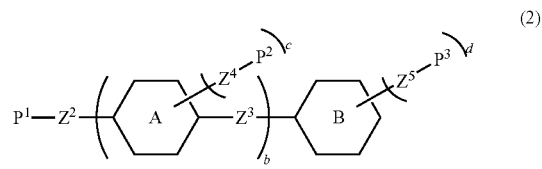

wherein, for example, X is —OH or —COOH; $Z^1$ is methylene; $Z^2$, $Z^3$, $Z^4$ and $Z^5$ are a single bond; L is —CH=CH—CH=CH—; $R^1$ is straight alkyl; $P^1$, $P^2$ and $P^3$ are a polymerizable group; ring A and ring B are 1,4-phenylene or naphthalene-2,6-diyl; and a, b, c and d are 0 or 1.

20 Claims, No Drawings

LIQUID CRYSTAL COMPOSITION AND LIQUID CRYSTAL DISPLAY DEVICE

CROSS-REFERENCE TO RELATED APPLICATION

This application claims the priority benefits of Japanese Patent Application No. 2014-086734, filed on Apr. 18, 2014. The entirety of the above-mentioned patent application is hereby incorporated by reference herein and made a part of this specification.

TECHNICAL FIELD

The invention relates to a liquid crystal composition containing, for example, an alignment control material. The alignment control material is formed of a self-alignment material having an effect on vertical alignment, and a polymerizable compound for alignment stabilization and pretilt adjustment. The invention also relates to a liquid crystal display (LCD) device in which the liquid crystal composition is sealed into a space between substrates of the device and the polymerizable compound is polymerized by light or heat, while voltage is applied to the device, to form an alignment control layer that controls alignment of liquid crystal molecules. The invention also includes an alignment film-less mode LCD device in which alignment of a liquid crystal medium is controlled without a polyimide alignment layer.

The invention relates to a liquid crystal composition mainly suitable for use in an active matrix (AM) device and so forth, and an AM device and so forth including the composition. In particular, the invention relates to a liquid crystal composition having a negative dielectric anisotropy, and a device including the composition and having an in-plane switching (IPS) mode, a fringe field switching (FFS) mode, a vertical alignment (VA) mode or a polymer sustained alignment (PSA) mode. The VA mode includes a multi-domain vertical alignment (MVA) mode and a patterned vertical alignment (PVA) mode.

BACKGROUND ART

For LCD devices, a classification based on the operating mode of liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a fringe field switching (FFS) mode, a vertical alignment (VA) mode and a polymer sustained alignment (PSA) mode. A classification based on the driving mode of the device includes a passive matrix (PM) type and an active matrix (AM) type. The PM type is classified into static type, multiplex type and so on, and AM type is classified into a thin film transistor (TFT) type, metal insulator metal (MIM) type and so on. The TFT type is further classified into amorphous silicon type and polysilicon type, wherein the latter is classified into a high-temperature type and a low-temperature type according to the production process. A classification based on the light source includes a reflective type utilizing natural light, a transmissive type utilizing a backlight and a transflective type utilizing both the natural light and a backlight.

The devices include a liquid crystal composition having suitable characteristics. The liquid crystal composition has a nematic phase. General characteristics of the composition should be improved in order to obtain an AM device having good general characteristics. Table 1 below summarizes the relationship between the general characteristics of the two aspects. The general characteristics of the composition will be further described based on a commercially available AM device. The temperature range of the nematic phase relates to the temperature range in which the device can be used. A preferred maximum temperature of a nematic phase is about 70° C. or higher and a preferred minimum temperature of a nematic phase is about −10° C. or lower. The viscosity of a composition relates to the response time of the device. A short response time is preferred for displaying moving images on the device. Hence, a small viscosity in the composition is preferred. A small viscosity at a low temperature is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption, Large contrast ratio |
| 5 | Large specific resistance | Large voltage holding ratio and large contrast ratio |
| 6 | High stability to UV light and heat | Long service life |

The optical anisotropy (Δn) of the composition relates to the contrast ratio of the device. The product (Δn×d) of the Δn of the composition and the cell gap (d) of the device is designed so as to maximize the contrast ratio. A suitable value of the product depends on the type of the operating mode. In a device of the VA or PSA mode, the suitable value is in the range of about 0.30 μm to about 0.40 μm, and in a device of the IPS mode, the suitable value is in the range of about 0.20 μm to about 0.30 μm. In the above case, a composition having a large Δn is preferred for a device having a small cell gap. A large absolute value of the dielectric anisotropy (Δ∈) of the composition contributes to a low threshold voltage, a small electric power consumption and a large contrast ratio of the device. Accordingly, a large absolute value of Δ∈ is preferred. A large specific resistance of the composition contributes to a large voltage holding ratio, and to a large contrast ratio of the device. Accordingly, a composition having a large specific resistance at room temperature and also at a high temperature in an initial stage is preferred. A composition having a large specific resistance at room temperature and also at a high temperature even after the device has been used for a long period of time is preferred. Stability of the composition to UV light and heat relates to the service life of the LCD device. In a case where the stability is high, the device has a long service life. Such characteristics are preferred for an AM device for use in a liquid crystal projector, a liquid crystal television and so forth.

A composition having a positive Δ∈ is used for an AM device of the TN mode. On the other hand, a composition having a negative Δ∈ is used for an AM device of the VA mode. A composition having a positive or negative Δ∈ is used for an AM device of the IPS or FFS mode. A composition having a positive or negative Δ∈ is used for an AM device of the PSA mode. Examples of the liquid crystal composition having a negative Δ∈ are disclosed in Patent literature Nos. 1 to 6 described below and so on for an AM device of PSA mode.

A desirable AM device has characteristics such as a wide temperature range in which the device can be used, a short response time, a large contrast ratio, a low threshold voltage, a large voltage holding ratio and a long service life. A shorter response time even by one millisecond is desirable. Thus, desirable characteristics of a composition include a high maximum temperature of nematic phase, a low minimum temperature of nematic phase, a small viscosity, a suitable optical anisotropy, a large positive or negative dielectric anisotropy, a large specific resistance, a high stability to UV light, and a high stability to heat.

A liquid crystal composition containing a polymer is used in an LCD device of the PSA mode. First, a liquid crystal composition to which a small amount of polymerizable compound is added is injected into the device. Next, the composition is irradiated with UV light, while a voltage is applied between substrates of the device, to polymerize the polymerizable compound and form a polymer network in the composition. In the composition, alignment of liquid crystal molecules can be controlled by the polymer, and therefore the response time of the device is shortened and image persistence is reduced. Such effect of the polymer can also be expected for a device of a mode such as the TN, ECB, OCB, IPS, FFS or VA mode.

In a general PSA-mode LCD device, a polyimide alignment film is formed on surfaces of a TFT substrate and a counter substrate, and then a liquid crystal is sealed into the space between the TFT substrate and the counter substrate. Meanwhile, Patent literature Nos. 7 to 9 and Non-patent literature No. 1 report a technology in which a step for forming an alignment film can be omitted. In the technology, a liquid crystal in which a polymerizable compound such as a (meth)acrylate is added is sealed into a space between a TFT substrate and a counter substrate, and then the polymerizable compound is polymerized by exposure to UV light to form on a substrate surface an alignment control layer for aligning liquid crystal molecules in a vertical or horizontal direction. An LCD in which the alignment control layer is formed by the technology is referred to as an alignment film-less mode LCD device.

In the alignment film-less mode LCD device described above, alignment regulation force in the alignment control layer is required to be satisfactory. Insufficiency of the alignment regulation force in the alignment control layer causes a decrease of the contrast ratio and light leakage. Non-patent literature No. 1 reports that a high-brightness LCD device can be constituted by a technique using two kinds of polymerizable compounds. However, the magnitude of the contrast ratio of the display device is far from sufficient.

Moreover, the alignment film-less mode LCD device has a merit of allowing omission of a step for forming an alignment film. However, the polyimide alignment film for accelerating the rate of the polymerization of (meth)acrylate is not formed in the mode, so the mode has a problem of insufficient polymerization reactivity. When the polymerization reactivity is insufficient, the "unreacted polymerizable compound," which is known to cause image persistence and so on, increases after a step for forming a pretilt.

Patent literature No. 9 studies a technique using a polymerizable compound and a self-alignment additive such as a steroid-based alcohol or a terphenyl-based amine as a material for an alignment control layer, succeeding in obtaining good alignment properties. However, the technique has a problem of low compatibility of the self-alignment additive with any other liquid crystal composition, which causes precipitation and so on during transportation or production of the LCD device to cause a content change or a poor display.

Accordingly, in the alignment film-less mode LCD device, the alignment control material is desirably excellent in the compatibility with any other component, and the polymerization reactivity of the polymerizable compound is desirably satisfactory.

Patent literature No. 1: JP 2003-307720 A.
Patent literature No. 2: JP 2004-131704 A.
Patent literature No. 3: JP 2006-133619 A.
Patent literature No. 4: EP 1889894 A.
Patent literature No. 5: JP 2010-537010 A.
Patent literature No. 6: JP 2010-537256 A.
Patent literature No. 7: JP 4515102 B.
Patent literature No. 8: JP 2005-208309 A.
Patent literature No. 9: WO 2012-038026 A.
Non-patent literature No. 1: Li et al., International Display Workshop (IDW) '09 vol. 1 p. 23 (2009)

SUMMARY OF INVENTION

In an alignment film-less mode LCD device using a liquid crystal composition containing a conventional alignment control material, satisfaction of display characteristics such as resistance to image persistence has been so far difficult.

Accordingly, the invention provides a liquid crystal composition containing an alignment control material that has high compatibility with other liquid crystal composition and is good in alignment regulation force. The invention also provides a liquid crystal composition containing an alignment control material and satisfying at least one of characteristics such as a high maximum temperature of nematic phase, a low minimum temperature of nematic phase, a small viscosity, a suitable optical anisotropy (a small optical anisotropy or a large optical anisotropy), a large negative dielectric anisotropy and a large specific resistance. The invention also provides a liquid crystal composition having a suitable balance between at least two of the characteristics. The invention further provides an LCD device including such a composition. The invention additionally provides a composition containing a polymer as a component of the alignment control material and having characteristics such as a small residual amount of the polymerizable compound, a small viscosity, a suitable optical anisotropy, a large negative dielectric anisotropy, a high stability to UV light and a high stability to heat, and provides an AM device having characteristics such as a small image persistence ratio, a short response time, a low threshold voltage, a large voltage holding ratio, a large contrast ratio and a long service life.

The invention concerns a liquid crystal composition that contains at least one compound selected from the group consisting of compounds represented by formula (1) as a first component and at least one compound selected from the group consisting of compounds represented by formula (2) as a second component, and concerns a liquid crystal display device including the composition.

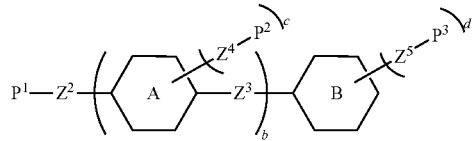

In formula (1), $R^1$ is straight alkyl having 2 to 25 carbons or branched alkyl having 3 to 25 carbons, and in the alkyl, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by halogen; L is a group selected from the group consisting of divalent groups represented by formulae (L-1) to (L-3);

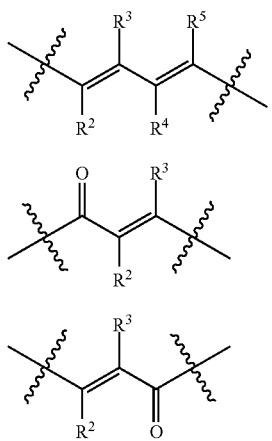

wherein in formulae (L-1) to (L-3), $R^2$, $R^3$, $R^4$ and $R^5$ are independently hydrogen, fluorine, methyl, ethyl or trifluoromethyl;

in formula (1), $Z^1$ is a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and at least one hydrogen may be replaced by halogen; X is —H, —OH, —$OR^6$, —COOH, —$COOR^6$, —$NH_2$, —$NHR^6$, —$NR^6_2$, —SH, —$SR^6$, —S—$SR^6$ or a group derived from a heterocycle containing at least one —NH— group and having 3 to 20 carbons, and in the heterocycle, at least one hydrogen may be replaced by halogen; $R^6$ is alkyl having 1 to 6 carbons; a is 1, 2 or 3; in formula (2), ring A is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring B is cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $P^1$, $P^2$, and $P^3$ are independently a polymerizable group; $Z^2$, $Z^4$ and $Z^5$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine; $Z^3$ is a single bond or alkylene having 1 to 10 carbons, and in the alkylene, at least one —$CH_2$— may be replaced by —O—, —CO—, —COO—, or —OCO—, at least one —$CH_2$—$CH_2$— may be replaced by —CH=CH—, —$C(CH_3)$=CH—, —CH=$C(CH_3)$— or —$C(CH_3)$=$O(CH_3)$—, and in the groups, at least one hydrogen may be replaced by fluorine or chlorine; b is 1, 2 or 3; and c and d are independently 0, 1, 2 or 3.

The invention also concerns use of the liquid crystal composition in an LCD device.

The liquid crystal composition of the invention contains an alignment control material having high compatibility with other liquid crystal composition and is good in alignment regulation force. The liquid crystal composition of the invention satisfies at least one of characteristics such as a high maximum temperature of nematic phase, a low minimum temperature of nematic phase, a small viscosity, a suitable optical anisotropy (a small optical anisotropy or a large optical anisotropy), a large negative dielectric anisotropy and a large specific resistance, or has a suitable balance between at least two of the characteristics. The LCD device of the invention includes such a composition. The composition of the invention may also contain a polymer as a component of the alignment control material and have characteristics such as a small residual amount of the polymerizable compound, a large pretilt angle, a small viscosity, a suitable optical anisotropy, a large negative dielectric anisotropy, a high stability to UV light and a high stability to heat. The AM device of the invention has characteristics such as a small image persistence ratio, a short response time, a low threshold voltage, a large voltage holding ratio, a large contrast ratio and a long service life.

DESCRIPTION OF EMBODIMENTS

Usage of terms herein is as described below. The term "liquid crystal composition" and "LCD device" may be occasionally abbreviated as "composition" and "device," respectively. "LCD device" is a generic term for an LCD panel and an LCD module. "Liquid crystal compound" is a generic term for a compound having a liquid crystal phase such as a nematic phase and a smectic phase, and a compound having no liquid crystal phase but being mixed with the composition for adjusting characteristics such as a temperature range of the nematic phase, viscosity and dielectric anisotropy. The compound has a six-membered ring such as 1,4-cyclohexylene or 1,4-phenylene, and has a rod like molecular structure. "Polymerizable compound" includes a compound to be added to the composition for forming a polymer in the composition.

The liquid crystal composition is prepared by mixing a plurality of liquid crystal compounds. The proportion (content) of a liquid crystal compounds is expressed in terms of weight percent (wt %) based on the weight of the liquid crystal composition. An additive such as an optically active compound, an antioxidant, a UV light absorbent, a dye, an antifoaming agent, a polymerizable compound, a polymerization initiator or a polymerization inhibitor is added to the composition, when necessary. The proportion (amount of addition) of the additive is expressed in terms of weight percent (wt %) based on the weight of the liquid crystal composition as in the case of liquid crystal compounds. Weight parts per million (ppm) may be occasionally used. The proportion of the polymerization initiator or the polymerization inhibitor is exceptionally expressed based on the weight of the polymerizable compound.

The higher limit of the temperature range of a nematic phase may be occasionally abbreviated as "maximum temperature." The lower limit of the temperature range of a nematic phase may be occasionally abbreviated as "minimum temperature." The expression "having a large specific resistance" means that the composition has a large specific resistance at room temperature and also at a temperature close to the maximum temperature of nematic phase in an initial stage, and that the composition has a large specific resistance at room temperature and also at a temperature close to the maximum temperature of nematic phase even after the device has been used for long time. The expression "having a large voltage holding ratio" means that the device has a large voltage holding ratio at room temperature and also at a temperature close to the maximum temperature of nematic phase in an initial stage, and that the device has a large voltage holding ratio at room temperature and also at a temperature close to the maximum temperature of nematic phase even after the device has been used for long time. The expression "increasing the dielectric anisotropy" means that the value positively increases for a composition having a positive dielectric anisotropy, and means that the value negatively increases for a composition having a negative dielectric anisotropy.

The expression "at least one "A" may be replaced by "B"" means that the number of "A" is arbitrary. When the number of "A" is 1, the position of "A" is arbitrary. When the number of "A" is 2 or more, the positions thereof can be selected without restriction. The same rule also applies to the expression "at least one "A" is replaced by "B"."

In formulae (1) to (4), symbols A, B, C or the like surrounded by a hexagonal shape correspond to ring A, ring B, ring C or the like. In formula (1), an oblique line crossing the hexagonal shape of ring A means that a bonding position on the ring can be arbitrarily selected for a $P^2$—$Z^4$ group. The same rule also applies to a $P^3$—$Z^5$ group or the like in ring B or the like. A suffix such as c represents the number of groups to be bonded with ring A or the like. When c is 2, two $P^2$—$Z^4$ groups exist on the ring A. Two groups represented by $P^2$—$Z^4$ may be identical or different. The same rule also applies to arbitrary two $P^2$—$Z^4$ groups when c is larger than 2. The same rule also applies to other groups. A compound represented by formula (1) may be occasionally abbreviated as compound (1). The abbreviation also applies to a compound represented by formula (2) or the like. Compound (1) means one compound or two or more compounds represented by formula (1). The symbol $R^1$ is used for a plurality of compounds in the chemical formulas of the component compounds. In the compounds, two groups represented by arbitrary two $R^1$ may be identical or different. In one case, for example, $R^1$ of compound (1) is hexyl and $R^1$ of compound (1-1) is hexyl. In another case, $R^1$ of compound (1) is hexyl and $R^1$ of compound (1-1) is octyl. The same rule also applies to the symbol X, $R^2$, $M^1$ or the like. In formula (2), when b is 2, two rings B exist.

In the compound, two rings represented by two rings B may be identical or different. The same rule also applies to a case where b is larger than 2. The rule is also applied to a symbol such as X, $P^2$, $Z^1$ or the like.

Then, 2-fluoro-1,4-phenylene means two divalent groups described below. In a chemical formula, fluorine may be leftward or rightward. The same rule also applies to other asymmetrical divalent ring groups, such as tetrahydropyran-2,5-diyl.

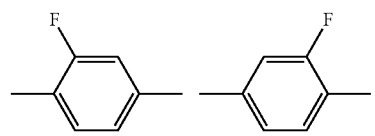

The present inventors have found out that a combination of compound (1), compound (2) and a liquid crystal composition is suitable for an alignment film-less mode LCD device for reasons described below. The reasons include: a) the solubility of compound (1) to the liquid crystal composition is high; b) when compound (1) coexists, compound (2) is easily polymerized to form a polymer; c) an amount of residual compound (2) is small after a polymerization step; d) the liquid crystal composition is good in alignment regulation force; e) the response time of the device is short; and (f) the degree of image persistence in the device is small.

The invention includes the items described below.

Item 1 is a liquid crystal composition which contains at least one compound selected from the group consisting of compounds represented by formula (1) as a first component and at least one compound selected from the group consisting of compounds represented by formula (2) as a second component:

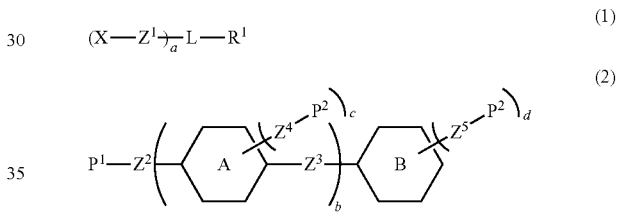

wherein in formula (1), $R^1$ is straight alkyl having 2 to 25 carbons or branched alkyl having 3 to 25 carbons, and in the alkyl, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by halogen; L is a group selected from the group consisting of divalent groups represented by formulae (L-1) to (L-3);

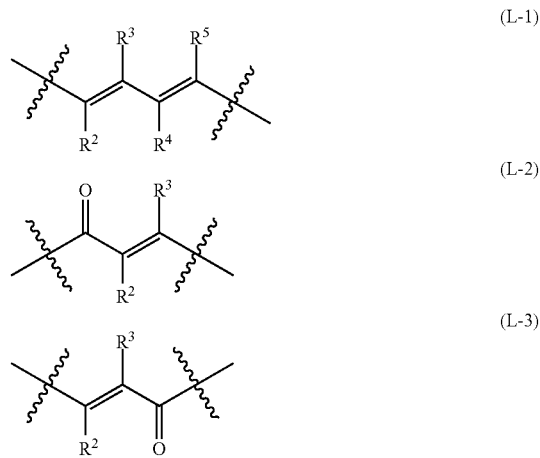

wherein in formulae (L-1) to (L-3), $R^2$, $R^3$, $R^4$ and $R^5$ are independently hydrogen, fluorine, methyl, ethyl or trifluoromethyl;

in formula (1), $Z^1$ is a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and at least one hydrogen may be replaced by halogen; X is —H, —OH, —$OR^6$, —COOH, —$COOR^6$, —$NH_2$, —$NHR^6$, —$NR^6{}_2$, —SH, —$SR^6$, —S—$SR^6$ or a group derived from a heterocycle containing at least one —NH— group and having 3 to 20 carbons, and in the heterocycle, at least one hydrogen may be replaced by halogen; $R^6$ is alkyl having 1 to 6 carbons; and a is 1, 2 or 3;

in formula (2), ring A is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring B is cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $P^1$, $P^2$ and $P^3$ are independently a polymerizable group; $Z^2$, $Z^4$ and $Z^5$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine; $Z^3$ is a single bond or alkylene having 1 to 10 carbons, and in the alkylene, at least one —$CH_2$— may be replaced by —O—, —CO—, —COO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; b is 0, 1, 2 or 3; and c and d are independently 0, 1, 2 or 3.

Item 2 is the liquid crystal composition of item 1 in which the second component is at least one compound selected from the group consisting of compounds represented by formula (2-1):

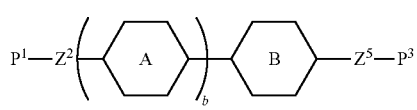

(2-1)

in formula (1), $R^1$ is straight alkyl having 2 to 25 carbons or branched alkyl having 3 to 25 carbons, and in the alkyl, at least one —$CH_2$— may be replaced by —O—, and at least one hydrogen may be replaced by halogen;

L is a group selected from the group consisting of divalent groups represented by formulae (L-1) to (L-3);

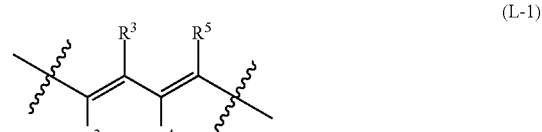

(L-1)

(L-2)

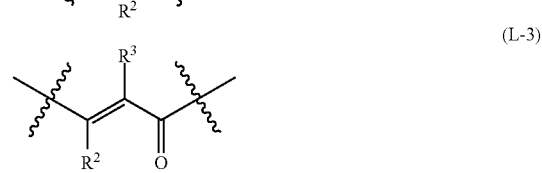

(L-3)

wherein in formulae (L-1) to (L-3), $R^2$, $R^3$, $R^4$ and $R^5$ are independently hydrogen, fluorine or methyl; $Z^1$ is a single bond or alkylene having 1 to 6 carbons, and in the alkylene, at least one —$CH_2$— may be replaced by —O—, and at least one hydrogen may be replaced by halogen; X is —H, —OH, —$OR^6$, —COOH, —$COOR^6$, —$NH_2$, —$NHR^6$, —$NR^6{}_2$, —SH, —$SR^6$ or —S—$SR^6$; $R^6$ is alkyl having 1 to 6 carbons; and a is 1 or 2;

and in formula (2-1), ring A and ring B are independently 1,4-cyclohexylene, 1,4-cyclohexenylene, 1,4-phenylene, naphthalene-1,4-diyl, naphthalene-1,5-diyl or naphthalene-2,6-diyl, and in the rings, at least one hydrogen may be replaced by halogen, alkyl having 1 to 3 carbons, or alkyl having 1 to 3 carbons in which at least one hydrogen is replaced by halogen; $Z^2$ and $Z^5$ are independently a single bond or alkylene having 1 to 4 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and at least one hydrogen may be replaced by halogen; $P^1$ and $P^3$ are independently a group selected from the groups represented by formulae (P-1) to (P-6):

(P-1)

(P-2)

(P-3)

(P-4)

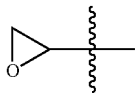
(P-5)

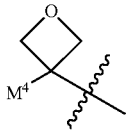
(P-6)

wherein in formulae (P-1) to (P-3), $M^1$, $M^2$ and $M^3$ are independently hydrogen, fluorine, alkyl having 1 to 5 carbons, or alkyl having 1 to 5 carbons in which at least one hydrogen is replaced by halogen; and in formula (P-6), $M^4$ is hydrogen, methyl, ethyl or propyl; when both $P^1$ and $P^3$ are a group represented by formula (P-4), at least one of $Z^2$ and $Z^5$ is alkylene in which at least one —$CH_2$— is replaced by —O—, —COO—, —OCO— or —OCOO—; and b is 0, 1 or 2.

Item 3 is the liquid crystal composition of item 1 or 2 in which the first component is at least one compound selected from the group consisting of compounds represented by formula (1-1), the second component is at least one compound selected from the group consisting of compounds represented by formula (2-1):

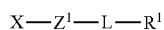
(1-1)

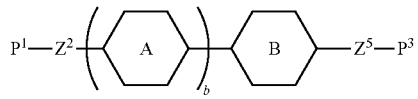
(2-1)

in formula (1-1), $R^1$ is straight alkyl having 4 to 20 carbons, and in the alkyl, at least one —$CH_2$— may be replaced by —O—, and at least one hydrogen may be replaced by halogen; $Z^1$ is a single bond or alkylene having 1 to 4 carbons, and in the alkylene, at least one —$CH_2$— may be replaced by —O—, and at least one hydrogen may be replaced by halogen; X is —OH, —COOH, —$NH_2$, —$NHR^6$, —SH, —$SR^6$ or —S—$SR^6$; $R^6$ is alkyl having 1 to 6 carbons; and L is a group selected from the group consisting of divalent groups represented by formulae (L-1-1) to (L-3-1):

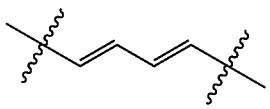
(L-1-1)

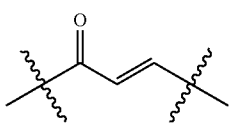
(L-2-1)

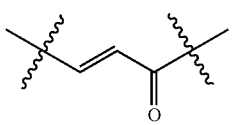
(L-3-1)

and in formula (2-1), $P^1$ and $P^2$ are independently a group selected from the group consisting of groups represented by formulae (P-1) and (P-5):

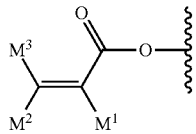
(P-1)

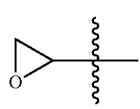
(P-5)

wherein in formula (P-1), $M^1$ and $M^2$ are independently hydrogen, fluorine, methyl or trifluoromethyl, and $M^3$ is hydrogen; $Z^2$ and $Z^5$ are independently a single bond or alkylene having 1 to 4 carbons, and in the alkylene, at least one —$CH_2$— may be replaced by —O—, —COO—, —OCO— or —OCOO—, and at least one —$CH_2$—$CH_2$— may be replaced by —CH=CH— or —C≡C—; ring A and ring B are independently 1,4-cyclohexylene, 1,4-phenylene, naphthalene-1,4-diyl, naphthalene-1,5-diyl or naphthalene-2,6-diyl, and in the rings, at least one hydrogen may be replaced by halogen, alkyl having 1 to 3 carbons, or alkyl having 1 to 3 carbons in which at least one hydrogen is replaced by halogen; and b is 0, 1 or 2.

Item 4 is the liquid crystal composition of items 1 to 3 in which the first component is at least one compound selected from the group consisting of compounds represented by formula (1-1-1), the second component is at least one compound selected from the group consisting of compounds represented by formula (2-1-1):

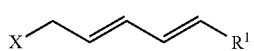
(1-1-1)

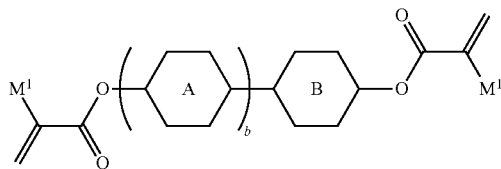
(2-1-1)

in formula (1-1-1), $R^1$ is straight alkyl having 4 to 20 carbons, and in the alkyl, at least one —$CH_2$— may be replaced by —O—; and X is —OH or —COOH; and in formula (2-1-1), $M^1$ is hydrogen, methyl or trifluoromethyl; ring A and ring B are independently 1,4-phenylene or naphthalene-2,6-diyl, and in the rings, at least one hydrogen may be replaced by halogen, alkyl having 1 to 3 carbons, or alkyl having 1 to 3 carbons in which at least one hydrogen is replaced by halogen; and b is 0, 1 or 2.

Item 5 is the liquid crystal composition of any one of items 1 to 4 in which the proportion of the first component is in the range of 0.05 wt % to 10 wt % and the proportion of the second component is in the range of 0.03 wt % to 10 wt %, based on the weight of the liquid crystal composition.

Item 6 is the liquid crystal composition of any one of items 1 to 5 which further contains at least one compound selected from the group consisting of compounds represented by formula (3) as a third component:

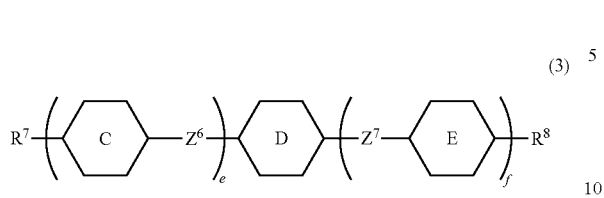

(3)

wherein in formula (3), R⁷ and R⁸ are independently alkyl having 1 to 12 carbons, alkoxy having 1 to 12 carbons, alkenyl having 2 to 12 carbons or alkenyloxy having 2 to 12 carbons; ring c and ring E are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; rings D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Z⁶ and Z⁷ are independently a single bond, —CH₂CH₂—, —CH₂O—, —OCH₂—, —COO— or —OCO—; e is 1, 2 or 3; and f is 0 or 1, and the sum of e and f is 3 or less.

Item 7 is the liquid crystal composition of item 6 in which the third component is at least one compound selected from the group consisting of compounds represented by formulae (3-1) to (3-19):

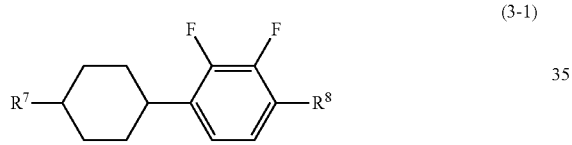
(3-1)

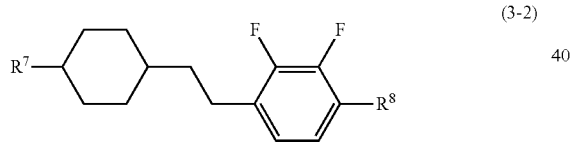
(3-2)

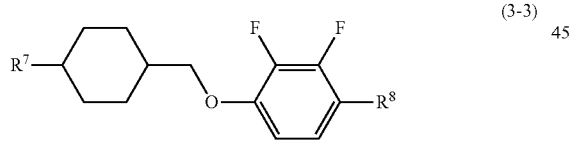
(3-3)

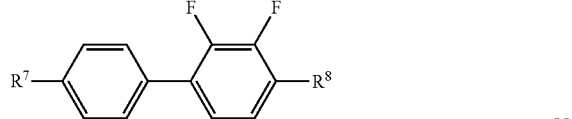
(3-4)

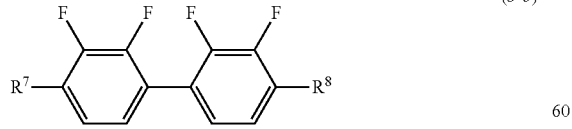
(3-5)

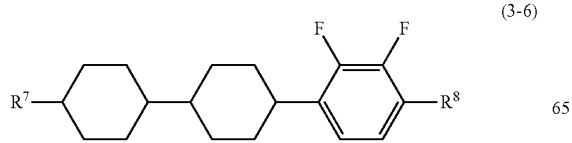
(3-6)

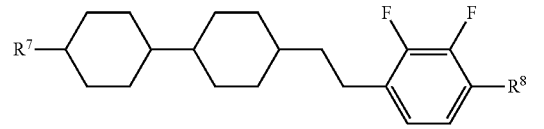
(3-7)

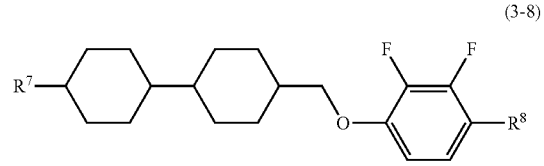
(3-8)

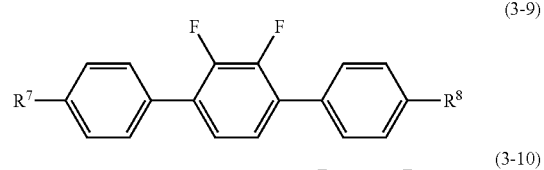
(3-9)

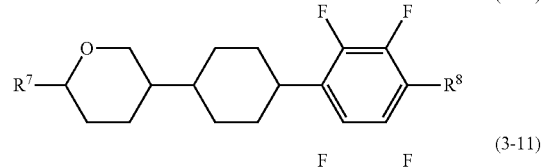
(3-10)

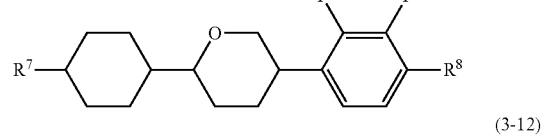
(3-11)

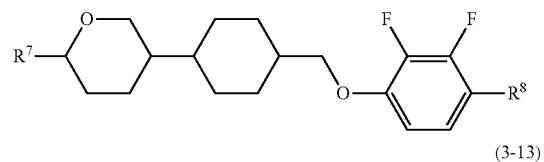
(3-12)

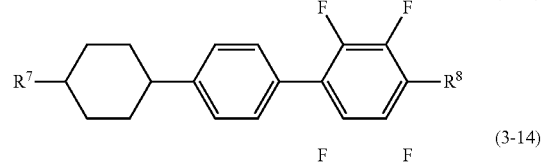
(3-13)

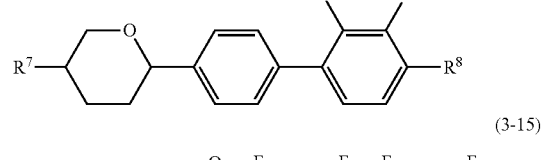
(3-14)

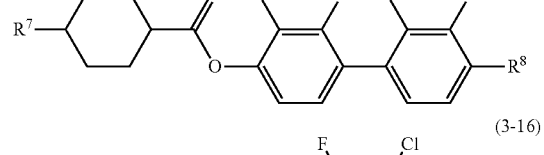
(3-15)

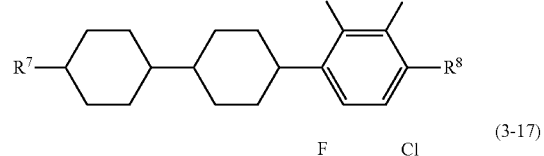
(3-16)

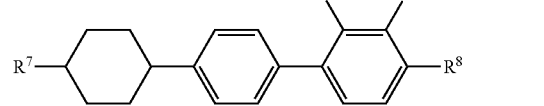
(3-17)

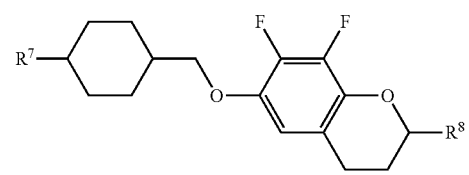
(3-18)

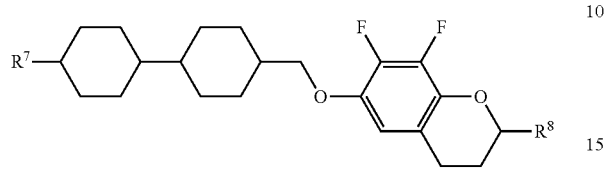
(3-19)

wherein in formulae (3-1) to (3-19), $R^7$ and $R^8$ are independently alkyl having 1 to 12 carbons, alkoxy having 1 to 12 carbons or alkenyl having 2 to 12 carbons.

Item 8 is the liquid crystal composition of item 6 or 7 in which the proportion of the third component is in a range of 10 wt % to 90 wt % based on the weight of the liquid crystal composition.

Item 9 is the liquid crystal composition of any one of items 6 to 8 which further contains at least one compound selected from the group consisting of compounds represented by formula (4) as a fourth component:

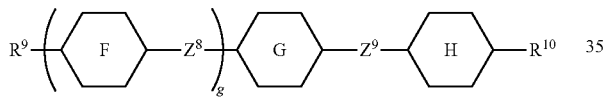
(4)

wherein in formula (4), $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring F, ring G and ring H are independently 1,4-cyclohexylene, 1,4-phenylene or 2-fluoro-1,4-phenylene; $Z^8$ and $Z^9$ are independently a single bond, —CH$_2$CH$_2$—, —CH$_2$O—, —OCH$_2$—, —COO— or —OCO—; and g is 0, 1 or 2.

Item 10 is the liquid crystal composition of item 9 in which the fourth component contains at least one compound selected from the group consisting of compounds represented by formulae (4-1) to (4-13):

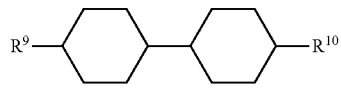
(4-1)

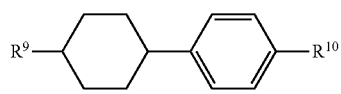
(4-2)

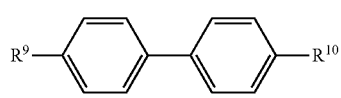
(4-3)

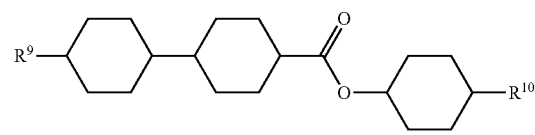
(4-4)

(4-5)

(4-6)

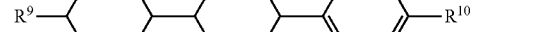
(4-7)

(4-8)

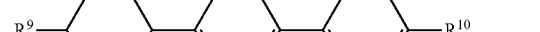
(4-9)

(4-10)

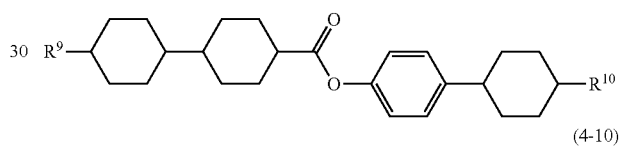
(4-11)

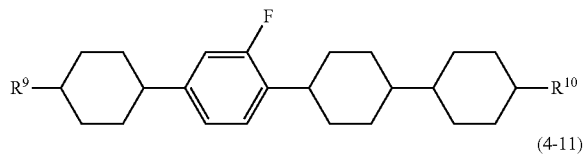
(4-12)

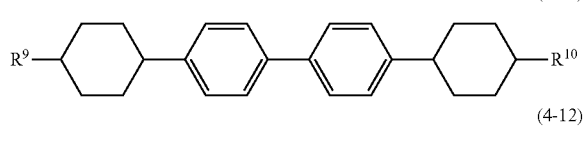
(4-13)

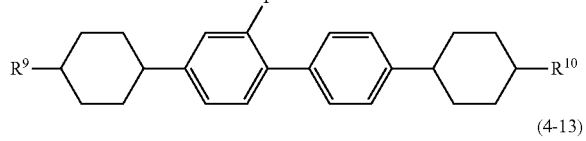

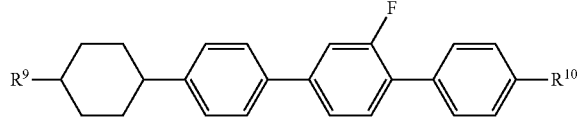

wherein in formulae (4-1) to (4-13), $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

Item 11 is the liquid crystal composition of item 9 or 10 in which the proportion of the fourth component is in the range of 10 wt % to 90 wt % based on the weight of the liquid crystal composition.

Item 12 is the liquid crystal composition of any one of items 1 to 11 which further contains a polymerization initiator.

Item 13 is the liquid crystal composition of any one of items 1 to 12 which further contains a polymerization inhibitor.

Item 14 is a liquid crystal display device including the liquid crystal composition of any one of items 1 to 13.

Item 15 is the liquid crystal display device of item 14 of which then operating mode is an IPS mode, a VA mode, an FFS mode or an FPA mode, and the driving mode is an active matrix mode.

Item 16 is a polymer sustained alignment mode liquid crystal display device which includes the liquid crystal composition of any one of items 1 to 13, or a composition obtained by polymerizing a polymerizable compound in the liquid crystal composition.

Item 17 is an alignment film-less mode liquid crystal display device which includes the liquid crystal composition of any one of items 1 to 13, or a composition obtained by polymerizing a polymerizable compound in the liquid crystal composition.

Item 18 is use of the liquid crystal composition of any one of items 1 to 13 in a liquid crystal display device.

Item 19 is use of the liquid crystal composition of any one of items 1 to 13 in a PSA-mode LCD device.

Item 20 is use of the liquid crystal composition of any one of items 1 to 13 in an alignment film-less mode LCD device.

The invention further includes the following items: a) a method for manufacturing an LCD device by arranging the liquid crystal composition between two substrates and irradiating the composition with light, while a voltage is applied, to polymerize the polymerizable compound contained in the composition; b) the liquid crystal composition for which the maximum temperature of nematic phase is 70° C. or higher, the Δn value (measured at 25° C.) at a wavelength of 589 nm is 0.08 or more, and the Δ∈ value (measured at 25° C.) at the frequency of 1 kHz is −2 or less.

The invention further includes the following items: c) the composition which further contains at least one compound selected from the group consisting of compounds (5) to (7) described in JP 2006-199941 A that is a liquid crystal compound having a positive dielectric anisotropy; d) the composition which contains compound (1); e) the composition which contains compound (1) and compound (2); f) the composition which further contains a polymerizable compound different from compounds (1) and (2); g) the composition which further contains at least one additive such as an optically active compound, an antioxidant, a UV light absorbent, a dye, an antifoaming agent, a polymerization initiator and a polymerization inhibitor; h) an AM device including the composition; i) a device including the composition and having a TN, ECB, OCB, IPS, FFS, VA or FPA mode; j) a transmissive device including the composition; k) use of the composition as a composition having a nematic phase; l) use as an optical activity composition by adding an optically active compound to the composition.

The composition of the invention will be described in the following order. First, the constitution of the component compounds in the composition is described. Second, main characteristics of the component compounds and main effects of the compounds on the composition are described. Third, the combination of the components in the composition, preferred proportions of the components and the bases thereof are described. Fourth, preferred embodiments of the component compounds are described. Fifth, specific examples of the component compounds are shown. Sixth, additives that may be mixed with the composition are described. Seventh, methods for synthesizing the component compounds are described. Last, the application of the composition is described.

First, the constitution of the component compounds in the composition is described. The composition of the invention is classified into composition A and composition B. Composition A may further contain other liquid crystal compound, an additive, an impurity or the like in addition to the polymerizable compound selected from compounds (1), (2), (3) and (4). "Other liquid crystal compound" means a liquid crystal compound different from compounds (1), (2), (3) and (4). Such a compound is mixed with the composition for further adjusting the characteristics. In other liquid crystal compounds, the proportion of a cyano compound is preferably as small as possible in view of the stability to heat or UV light. A further preferred proportion of the cyano compound is 0 wt %. The additives include an optically active compound, an antioxidant, a UV light absorbent, a dye, an antifoaming agent and a polymerization initiator. The impurity includes a compound mixed in a process such as preparation of the component compounds. Even in the case where the compound is liquid crystalline, the compound is classified as the impurity herein.

Composition B consists essentially of compounds (1), (2), (3) and (4). The term "essentially" means that the composition may contain an additive or impurity, but does not contain any liquid crystal compound different from the compounds thereof. Composition B has a smaller number of components than composition A has. Composition B is preferred to composition A in view of cost reduction. Composition A is preferred to composition B in view of the possibility of further adjusting physical properties by mixing with other liquid crystal compound.

Second, the main characteristics of the component compounds and the main effects of the compounds on the characteristics of the composition are described. The main characteristics of the component compounds are summarized in Table 2 on the basis of advantageous effects of the invention. In Table 2, the symbol "L" stands for "large" or "high," "M" stands for "medium," and "S" stands for "small" or "low." The symbols L, M and S represent a classification based on a qualitative comparison between the component compounds, and 0 (zero) means "a value close to zero."

TABLE 2

Characteristics of Compounds

| | Compounds | |
|---|---|---|
| | (3) | (4) |
| Maximum temperature | S to L | S to L |
| Viscosity | M to L | S to M |
| Optical anisotropy | M to L | S to L |
| Dielectric anisotropy | M to L[1)] | 0 |
| Specific resistance | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (1) is a self-alignment material that is adsorbed onto a substrate to mainly have an effect on controlling alignment of liquid crystal molecules in a vertical direction. Compound (1) is formed of a) a functional group having a hetero atom, b) a moiety having a conjugated double bond such as diene and enone, and c) a moiety having an alkyl structure. Then, a) is a functional group that contributes to adhesion by non-covalent bond interaction with a glass substrate surface or a metal oxide substrate surface, and the moiety b) is effective in improving the strength of the alignment control film due to covalent bond formation by copolymerization with compound (2), and in promoting the polymerization rate of compound (2). Further, the moiety c) contributes to vertical alignment properties of the liquid crystal. Compound (2) is polymerized to give a polymer, which immobilizes compound (1) onto the substrate surface to control the pretilt. More specifically, an alignment control layer is formed on the substrate surface by compound (1) and compound (2). The alignment control layer shortens the response time of the device and reduces the image persistence. Compound (3) increases the absolute value of dielectric anisotropy and decreases the minimum temperature. Compound (4) decreases the viscosity, increases the maximum temperature or decreases the minimum temperature.

Third, the combination of the components in the composition, the preferred proportiond of the components and the bases thereof are described. Preferred combinations of the components in the composition include a combination of the $1^{st}$ component, the $2^{nd}$ component and the $3^{rd}$ component, a combination of the $1^{st}$ component, the $2^{nd}$ component and the $4^{th}$ component, and a combination of the $1^{st}$ component, the $2^{nd}$ component, the $3^{rd}$ component and the $4^{th}$ component. A further preferred combination is a combination of the $1^{st}$ component, the $2^{nd}$ component, the $3^{rd}$ component and the $4^{th}$ component.

The first component is added to the liquid crystal composition for controlling the alignment of the liquid crystal molecules. A preferred proportion of addition of the first component is about 0.05 wt % or more for aligning the liquid crystal molecules and about 10 wt % or less for preventing a poor display in the device. A further preferred proportion is in the range of about 0.1 wt % to about 7 wt %. A particularly preferred proportion is in the range of about 0.5 wt % to about 5 wt %.

The polymerizable compound such as the second component is added to the liquid crystal composition together with the first component for forming the alignment control layer. A preferred proportion of addition of the second component is about 0.03 wt % or more for improving the long-term reliability of the device and about 10 wt % or less for preventing a poor display in the device. A further preferred proportion is in the range of about 0.1 wt % to about 2 wt %. A particularly preferred proportion is in the range of about 0.2 wt % to about 1 wt %.

A preferred proportion of the third component is about 10 wt % or more in order to increase the dielectric anisotropy and about 90 wt % or less for decreasing the viscosity. A further preferred proportion is in the range of about 20 wt % to about 80 wt %. A particularly preferred proportion is in the range of about 30 wt % to about 70 wt %.

A preferred proportion of the fourth component is about 10 wt % or more for increasing the maximum temperature or decreasing the viscosity and about 90 wt % or less for decreasing the minimum temperature. A further preferred proportion is in the range of about 20 wt % to about 80 wt %. A particularly preferred proportion is in the range of about 30 wt % to about 70 wt %.

Fourth, the preferred embodiment of the component compounds are described. $R^1$ is straight alkyl having 2 to 25 carbons or branched alkyl having 3 to 25 carbons, and in the alkyl, at least one —$CH_2$— may be replaced by —O—, —COO—, —OCO— or —OCOO—, at least one —$CH_2$—$CH_2$— may be replaced by —CH=CH— or —C≡C—, and at least one hydrogen may be replaced by halogen. Preferred $R^1$ is alkyl having 5 or more carbons for improving the alignment regulation force of the liquid crystal composition, or alkyl having 22 or less carbons for improving the compatibility with other liquid crystal composition. Further preferred $R^1$ is straight alkyl having 6 to 20 carbons for obtaining a suitable alignment regulation force and good compatibility.

$R^7$ and $R^8$ are independently alkyl having 1 to 12 carbons, alkoxy having 1 to 12 carbons, alkenyl having 2 to 12 carbons or alkenyloxy having 2 to 12 carbons. Preferred $R^7$ or $R^8$ is alkyl having 1 to 12 carbons for increasing the stability to UV light or heat, or is alkoxy having 1 to 12 carbons for decreasing the viscosity or increasing the absolute value of dielectric anisotropy.

$R^9$ and $R^{10}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine. Preferred $R^9$ or $R^{10}$ is alkenyl having 2 to 12 carbons for decreasing the viscosity, or is alkyl having 1 to 12 carbons for increasing the stability to UV light or heat.

Preferred alkyl groups in $R^7$, $R^8$, $R^9$ and $R^{10}$ include methyl, ethyl, propyl, butyl, pentyl, hexyl, heptyl and octyl. Further preferred alkyl groups include ethyl, propyl, butyl, pentyl and heptyl for decreasing the viscosity.

Preferred alkoxy groups in $R^7$, $R^8$, $R^9$ and $R^{10}$ include methoxy, ethoxy, propoxy, butoxy, pentyloxy, hexyloxy and heptyloxy. Further preferred alkoxy groups include methoxy and ethoxy for decreasing the viscosity.

Preferred alkenyl groups in $R^7$, $R^8$, $R^9$ and $R^{10}$ include vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl. Further preferred alkenyl groups include vinyl, 1-propenyl, 3-butenyl and 3-pentenyl for decreasing the viscosity. The preferred configuration of —CH=CH— in the alkenyl depends on the position of the double bond. Trans is preferred for alkenyl such as 1-propenyl, 1-butenyl, 1-pentenyl, 1-hexenyl, 3-pentenyl and 3-hexenyl for decreasing the viscosity, or the like. Cis is preferred for alkenyl such as 2-butenyl, 2-pentenyl and 2-hexenyl. Among the alkenyl groups, straight alkenyl is preferred to branched alkenyl.

Preferred alkenyloxy groups in $R^7$, $R^8$, $R^9$ and $R^{10}$ include vinyloxy, allyloxy, 3-butenyloxy, 3-pentenyloxy and 4-pentenyloxy. Further preferred alkenyloxy groups include allyloxy and 3-butenyloxy for decreasing the viscosity.

Preferred examples of alkenyl in which at least one hydrogen is replaced by fluorine in $R^7$, $R^8$, $R^9$ and $R^{10}$ include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

The alkyl in $R^7$, $R^8$, $R^9$ and $R^{10}$ does not include cyclic alkyl. The alkoxy does not include cyclic alkoxy. The alkenyl does not include cyclic alkenyl. For the configuration of 1,4-cyclohexylene, trans is preferred to cis for increasing the maximum temperature.

L is a group selected from the group consisting of divalent groups represented by formulae (L-1) to (L-3);

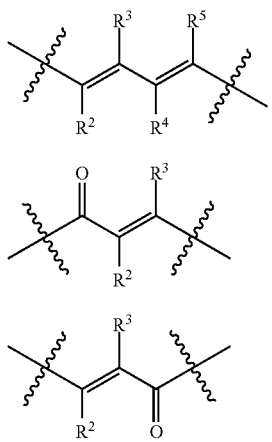

wherein in the formulae (L-1) to (L-3), $R^2$, $R^3$, $R^4$ and $R^5$ are independently hydrogen, fluorine, methyl, ethyl or trifluoromethyl. Preferred L is a divalent group represented by formula (L-1) for increasing the reactivity of the polymerizable compound. Preferred $R^2$, $R^3$, $R^4$ or $R^5$ is hydrogen or fluorine for increasing the alignment regulation force of the liquid crystal composition, wherein hydrogen is further preferred.

Ring A includes 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl. In these rings, at least one hydrogen may be replaced by halogen, alkyl having 1 to 12 carbons, alkoxy having 1 to 12 carbons, or alkyl having 1 to 12 carbons in which at least one hydrogen is replaced by halogen. Preferred ring A is 1,4-phenylene in which at least one hydrogen may be replaced by halogen, alkyl having 1 to 12 carbons, or alkyl having 1 to 12 carbons in which at least one hydrogen is replaced by halogen. Further preferred ring A is 1,4-phenylene.

Ring B includes cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl. In these rings, at least one hydrogen may be replaced by halogen, alkyl having 1 to 12 carbons, alkoxy having 1 to 12 carbons, or alkyl having 1 to 12 carbons in which at least one hydrogen is replaced by halogen. Preferred ring B is 1,4-phenylene in which at least one hydrogen may be replaced by halogen, alkyl having 1 to 12 carbons, or alkyl having 1 to 12 carbons in which at least one hydrogen is replaced by halogen. Further preferred ring B is 1,4-phenylene.

Ring C and ring E are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl, and arbitrary two rings C when e is 2 or 3 may be identical or different. Preferred ring C or ring E is 1,4-cyclohexylene for decreasing the viscosity or 1,4-phenylene for increasing optical anisotropy. Tetrahydropyran-2,5-diyl is:

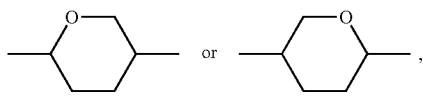

preferably

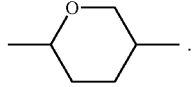

Ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring D is 2,3-difluoro-1,4-phenylene for decreasing the viscosity, or is 2-chloro-3-fluoro-1,4-phenylene for decreasing the optical anisotropy, or is 7,8-difluorochroman-2,6-diyl for increasing the absolute value of dielectric anisotropy.

Ring F, ring G and ring H are independently 1,4-cyclohexylene, 1,4-phenylene or 2-fluoro-1,4-phenylene, and the two rings F when g is 2 may be identical or different. Preferred ring F, ring G or ring H is 1,4-cyclohexylene for decreasing the viscosity and for increasing the maximum temperature, or is 1,4-phenylene for decreasing the minimum temperature.

$Z^1$ is a single bond or alkylene having 1 to 10 carbons. In the alkylene, at least one —$CH_2$— may be replaced by —O—, —COO—, —OCO— or —OCOO—, at least one —$CH_2$—$CH_2$— may be replaced by —CH=CH— or —C≡C—, and at least one hydrogen may be replaced by halogen. Preferred $Z^1$ is a single bond, methylene, ethylene, n-propylene, n-butylene, n-pentylene or n-hexylene for increasing the alignment regulation force of the liquid crystal. Further preferred $Z^1$ is a single bond, methylene, ethylene or n-propylene.

$Z^2$, $Z^4$ and $Z^5$ are independently alkylene having 1 to 10 carbons. In the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine. Preferred $Z^2$, $Z^4$ or $Z^5$ is a single bond or alkylene having 1 to 3 carbons for increasing the compatibility with other liquid crystal compounds and for obtaining suitable polymerization reactivity. Further preferred $Z^2$, $Z^4$ or $Z^5$ is a single bond for obtaining a suitable polymerization reactivity.

$Z^3$ is a single bond or alkylene having 1 to 10 carbons. In the alkylene, at least one —$CH_2$— may be replaced by —O—, —CO—, —COO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine. Preferred $Z^3$ is a single bond for obtaining a suitable polymerization reactivity.

$Z^6$, $Z^7$, $Z^8$ and $Z^9$ are independently a single bond, —$CH_2CH_2$—, —$CH_2O$—, —$OCH_2$—, —COO— or —OCO—, and arbitrary two $Z^6$ when e is 2 or 3 may be identical or different, and the two $Z^8$ when g is 2 may be identical or different. Preferred $Z^6$, $Z^7$, $Z^8$ or $Z^9$ is a single bond for decreasing the viscosity, or is —$CH_2CH_2$— for decreasing the minimum temperature, or is —$CH_2O$— for increasing the absolute value of dielectric anisotropy.

X is —H, —OH, —$OR^6$, —COOH, —$COOR^6$, —$NH_2$, —$NHR^6$, —$NR^6{}_2$, —SH, —$SR^6$, —S—$SR^6$ or a group derived from a heterocycle containing at least one —NH— group and having 3 to 20 carbons. In the heterocycle, at least one hydrogen may be replaced by halogen. Preferred X is —OH, —COOH, —$COOR^6$, —$NH_2$, —$NHR^6$, —SH or —S—$SR^6$ for increasing adsorptivity onto the substrate surface and for obtaining a good alignment regulation force. Further preferred X is —OH, —COOH, —NH$_2$, —NHR$^6$ or —SH. R$^6$ is alkyl having 1 to 6 carbons. Preferred R$^6$ is methyl, ethyl or n-propyl for increasing the alignment regulation force.

L is a single bond, —COO—, —OCO—, —CH=CH— or —O—. Preferred L is a single bond for obtaining a suitable alignment regulation force.

P$^1$, P$^2$ and P$^3$ are independently a polymerizable group. Examples of the polymerizable groups P$^1$, P$^2$ and P$^3$ include groups represented by formulae (P-1) to (P-6), but are not limited thereto.

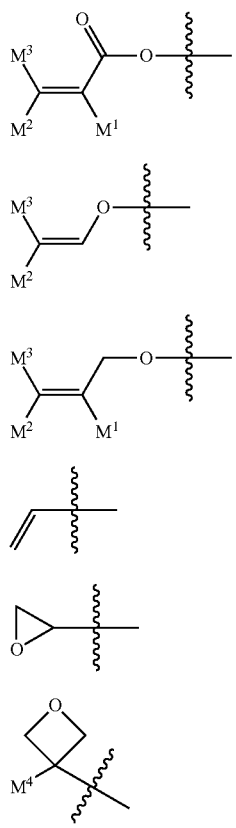

Preferred P1, P$^2$ or P$^3$ is a group represented by formula (P-1) for increasing the polymerization reactivity and for shortening the response time. Further preferred group (P-1) is —OCO—CH=CH$_2$ or —OCO—C(CH$_3$)=CH$_2$ for increasing the polymerization reactivity. A wavy line of groups (P-1) to (P-6) indicates a bonding site.

In groups (P-1) to (P-6), M$^1$, M$^2$ and M$^3$ are independently hydrogen, fluorine, alkyl having 1 to 5 carbons, or alkyl having 1 to 5 carbons in which at least one hydrogen is replaced by halogen. Preferred M$^2$ or M$^2$ is hydrogen or methyl for increasing the polymerization reactivity. Further preferred M$^1$ is methyl and further preferred M$^2$ is hydrogen. When all of P$^2$, the c pieces of P$^2$ and the d pieces of P$^3$ are group (P-1), arbitrary two M$^1$, M$^2$ or M$^3$ of M$^1$ in P$^1$, M$^1$ in the c pieces of P$^2$, and the d pieces of P$^3$ may be identical or different. The same rule applies to a case of group (P-2) or group (P-3).

When all of P$^1$, the c pieces of P$^2$ and the d pieces of P$^3$ are group (P-6), M$^4$ in P$^1$, M$^4$ in P$^2$ and M$^4$ in P$^3$ may be identical or different. In group (P-6), M$^4$ is hydrogen, methyl, ethyl or propyl. Preferred M$^4$ is methyl or ethyl for increasing the reactivity.

Then, a is 1, 2 or 3. Preferred a is 1 for increasing the alignment regulation force of the liquid crystal.

Then, b is 0, 1, 2 or 3. Preferred b is 0, 1 or 2 for increasing the polymerization reactivity. Further preferred b is 0 or 1 for obtaining the suitable polymerization reactivity.

Then, c and d are independently 0, 1, 2 or 3. Preferred c is 0 for obtaining a suitable polymerization reactivity, and preferred d is 1 for obtaining a suitable polymerization reactivity.

Further, e is 1, 2 or 3. Preferred e is 1 for decreasing the viscosity, and 2 or 3 for increasing the maximum temperature. Then, f is 0 or 1. Preferred f is 0 for decreasing the viscosity, or is 1 for decreasing the minimum temperature. In formula (3), f is 0, 1 or 2. Preferred f is 0 for decreasing the viscosity, or is 1 or 2 for increasing the maximum temperature.

Then, g is 0, 1 or 2. Preferred g is 0 or 1.

Fifth, preferred component compounds are shown. Preferred compounds (1) are not particularly limited, and specific examples thereof include compounds (1-1-1-1) to (1-1-1-30), (1-1-2-1) to (1-1-2-75) and (1-1-3-1) to (1-1-3-15).

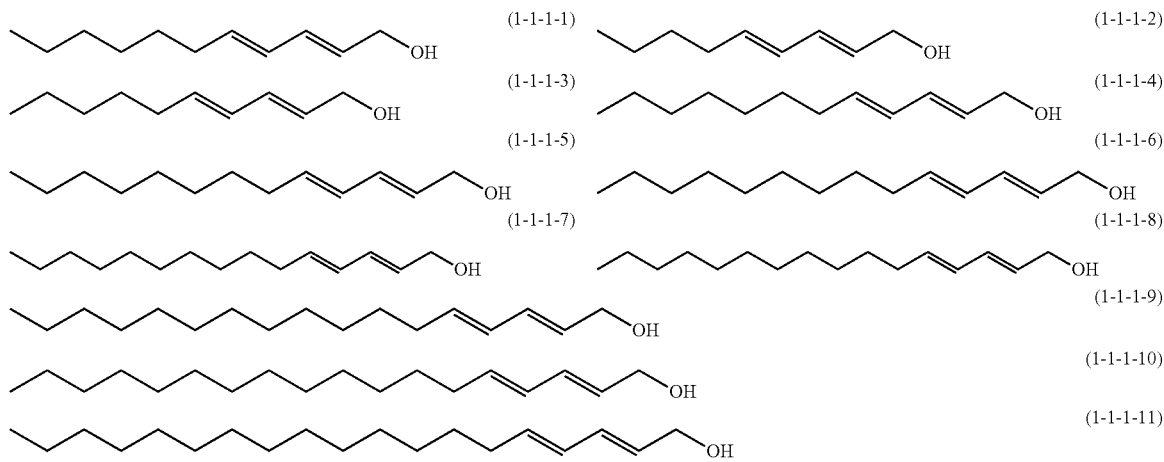

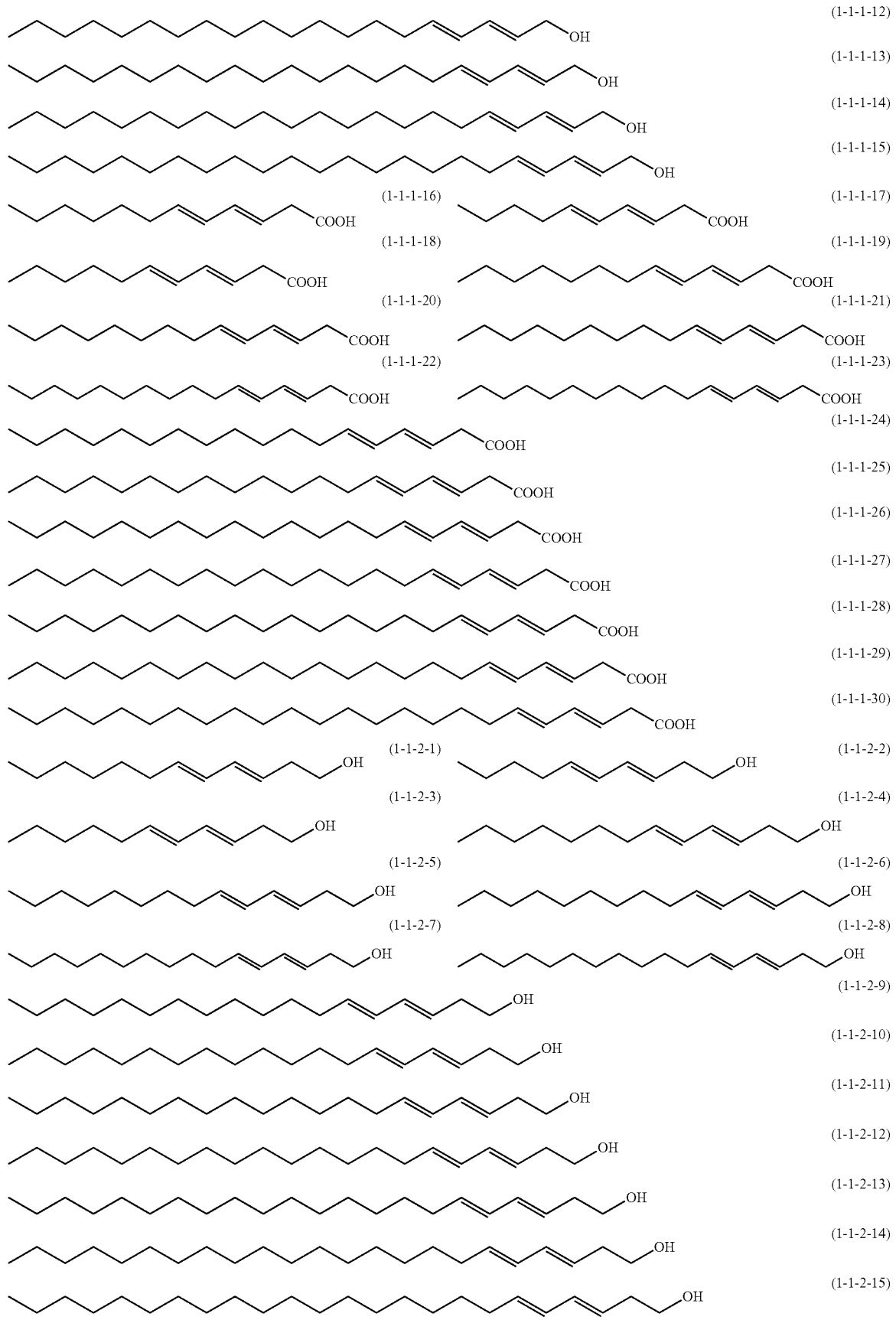

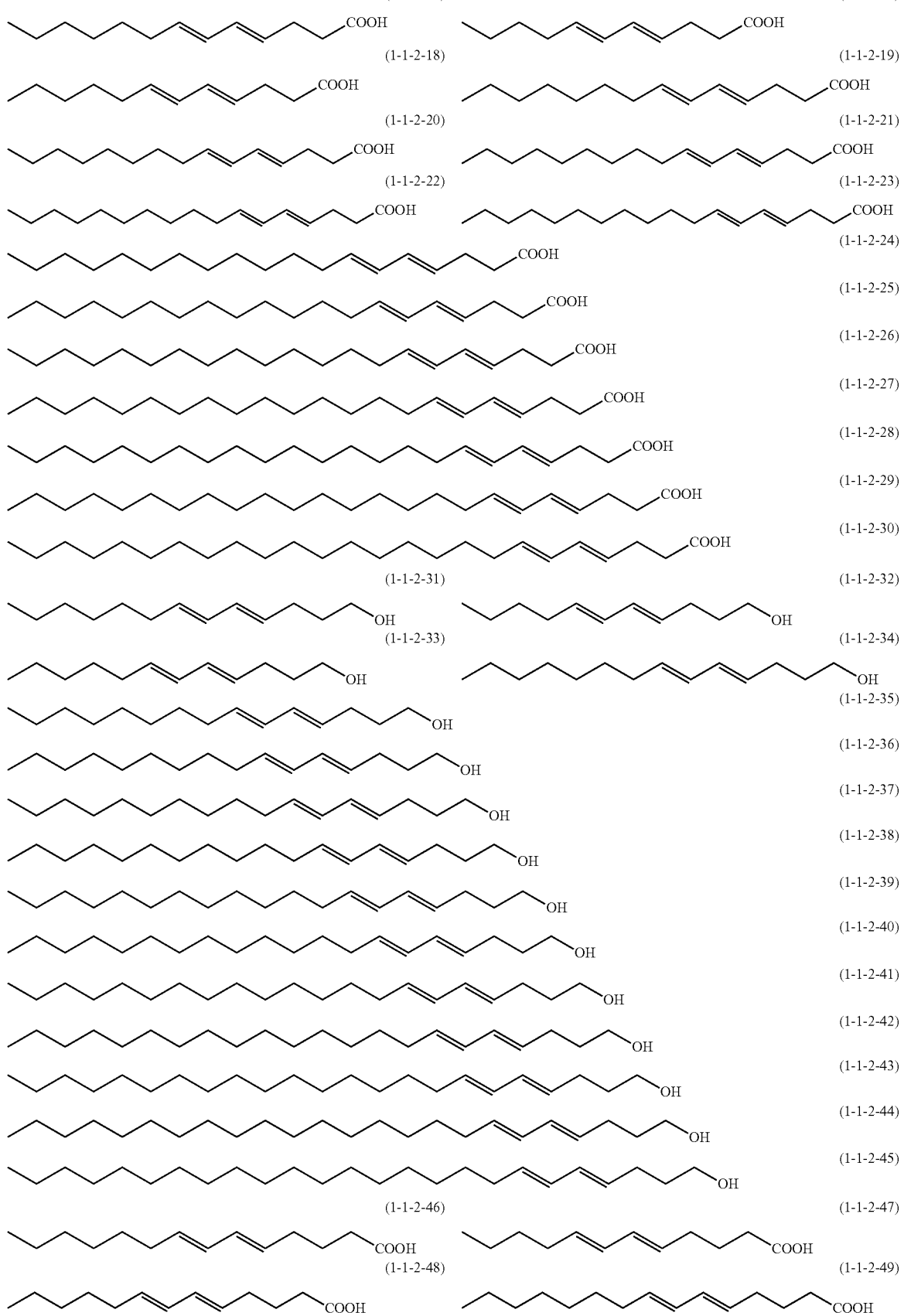

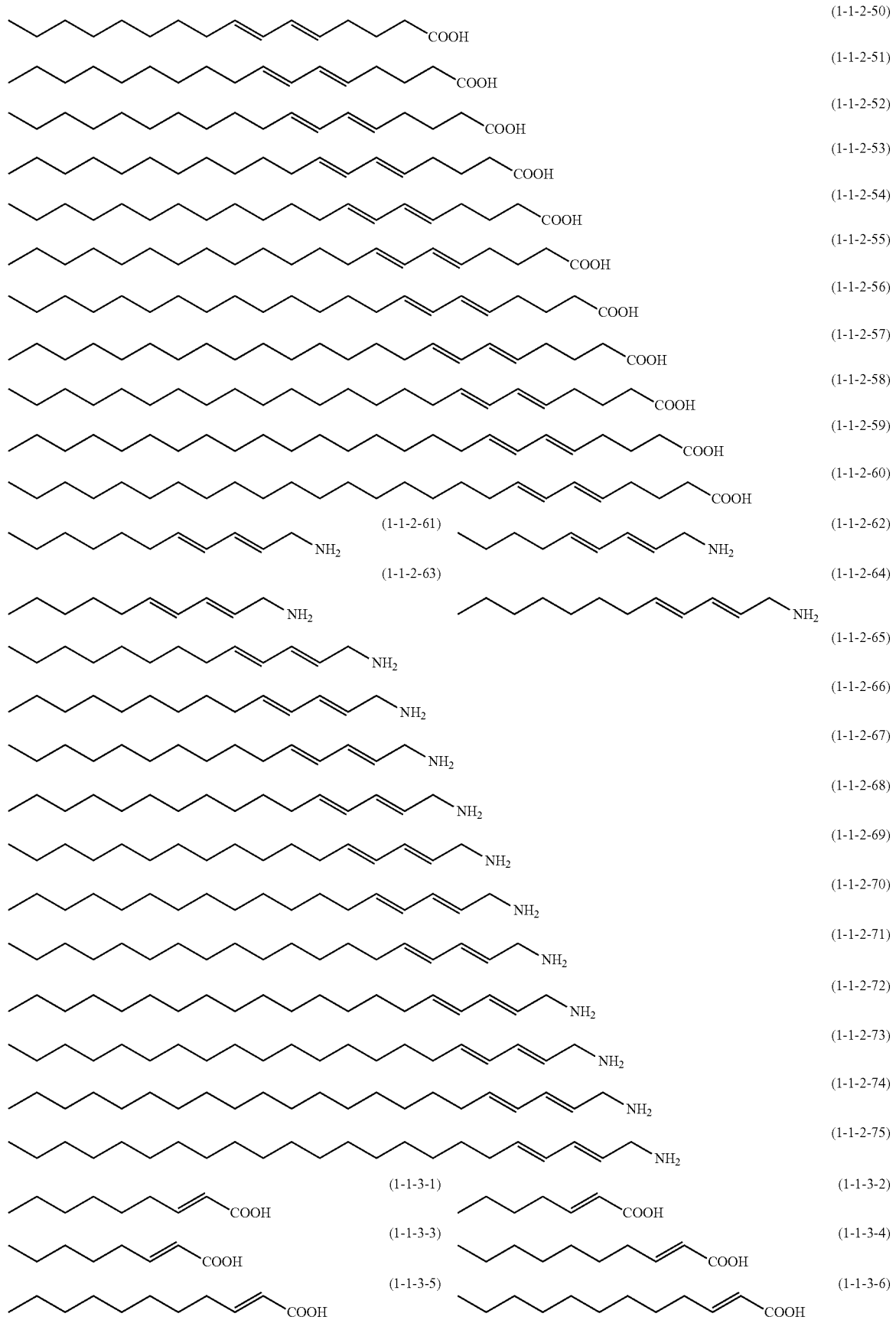

-continued

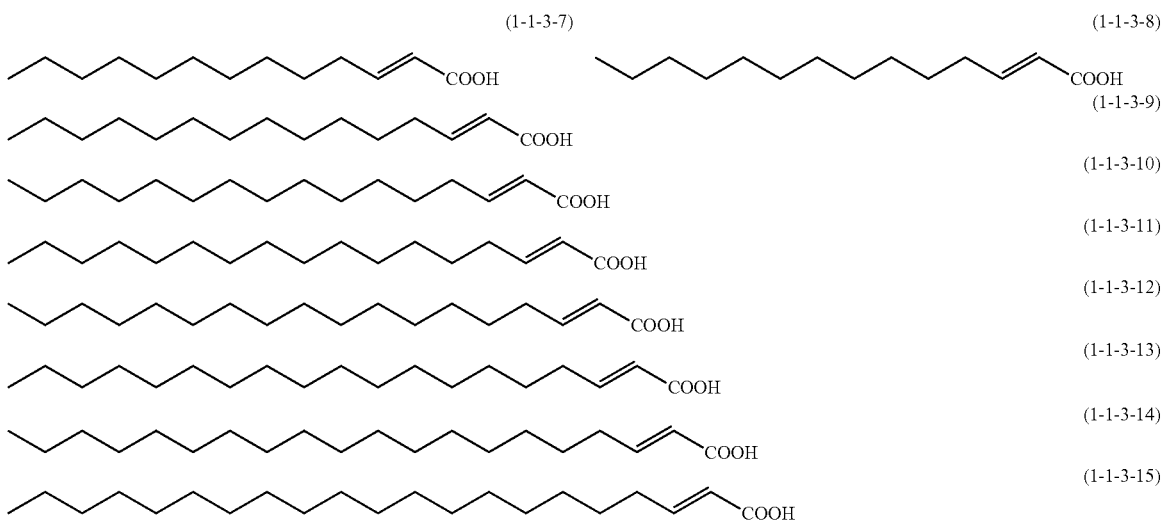

Preferred compounds (2) are not particularly limited, and specific examples thereof include compounds (2-1-1-1) to (2-1-1-6).

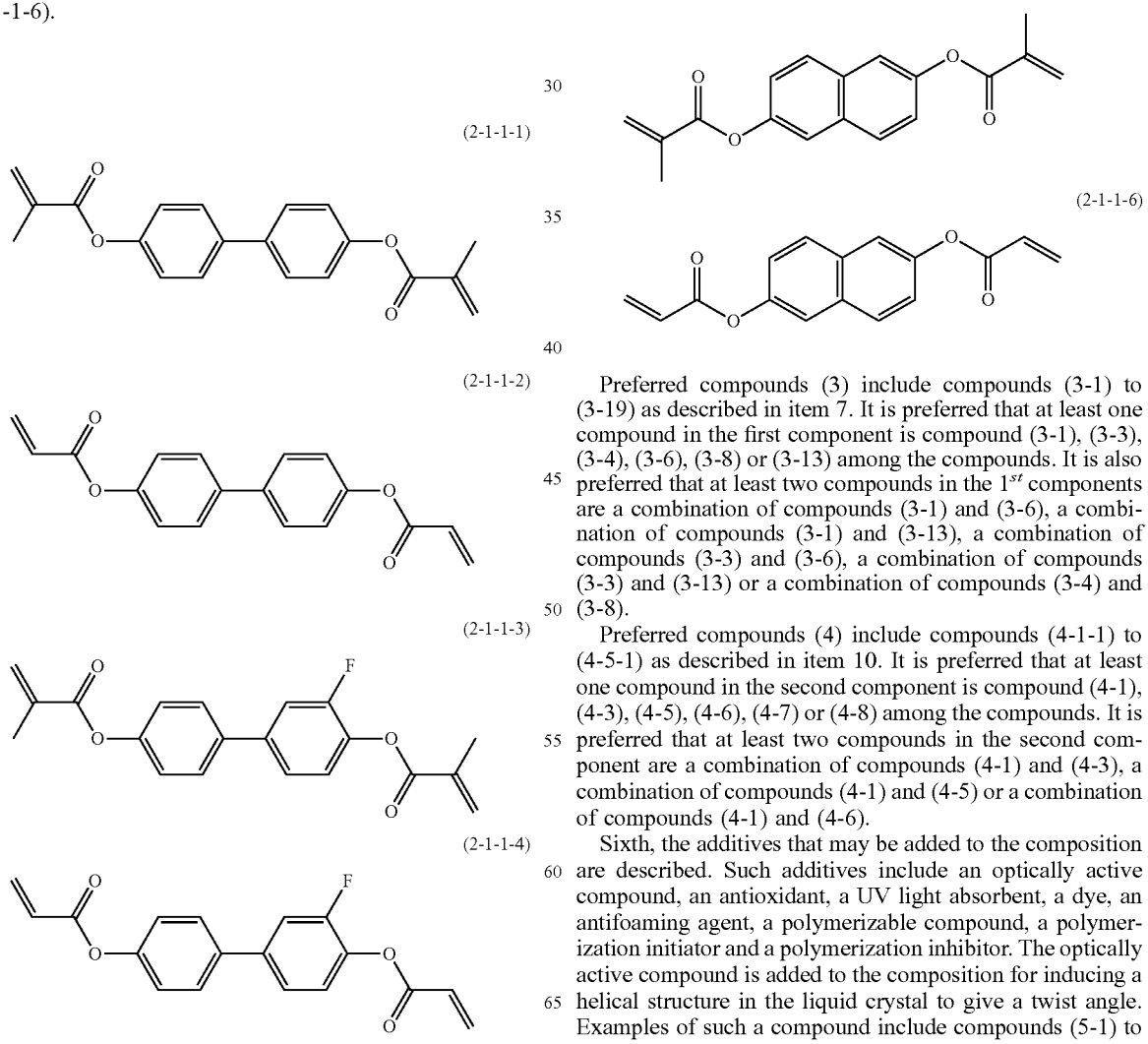

Preferred compounds (3) include compounds (3-1) to (3-19) as described in item 7. It is preferred that at least one compound in the first component is compound (3-1), (3-3), (3-4), (3-6), (3-8) or (3-13) among the compounds. It is also preferred that at least two compounds in the $1^{st}$ components are a combination of compounds (3-1) and (3-6), a combination of compounds (3-1) and (3-13), a combination of compounds (3-3) and (3-6), a combination of compounds (3-3) and (3-13) or a combination of compounds (3-4) and (3-8).

Preferred compounds (4) include compounds (4-1-1) to (4-5-1) as described in item 10. It is preferred that at least one compound in the second component is compound (4-1), (4-3), (4-5), (4-6), (4-7) or (4-8) among the compounds. It is preferred that at least two compounds in the second component are a combination of compounds (4-1) and (4-3), a combination of compounds (4-1) and (4-5) or a combination of compounds (4-1) and (4-6).

Sixth, the additives that may be added to the composition are described. Such additives include an optically active compound, an antioxidant, a UV light absorbent, a dye, an antifoaming agent, a polymerizable compound, a polymerization initiator and a polymerization inhibitor. The optically active compound is added to the composition for inducing a helical structure in the liquid crystal to give a twist angle. Examples of such a compound include compounds (5-1) to (5-5). A preferred proportion of the optically active compound is about 5 wt % or less. A further preferred proportion is in the range of about 0.01 wt % to about 2 wt %.

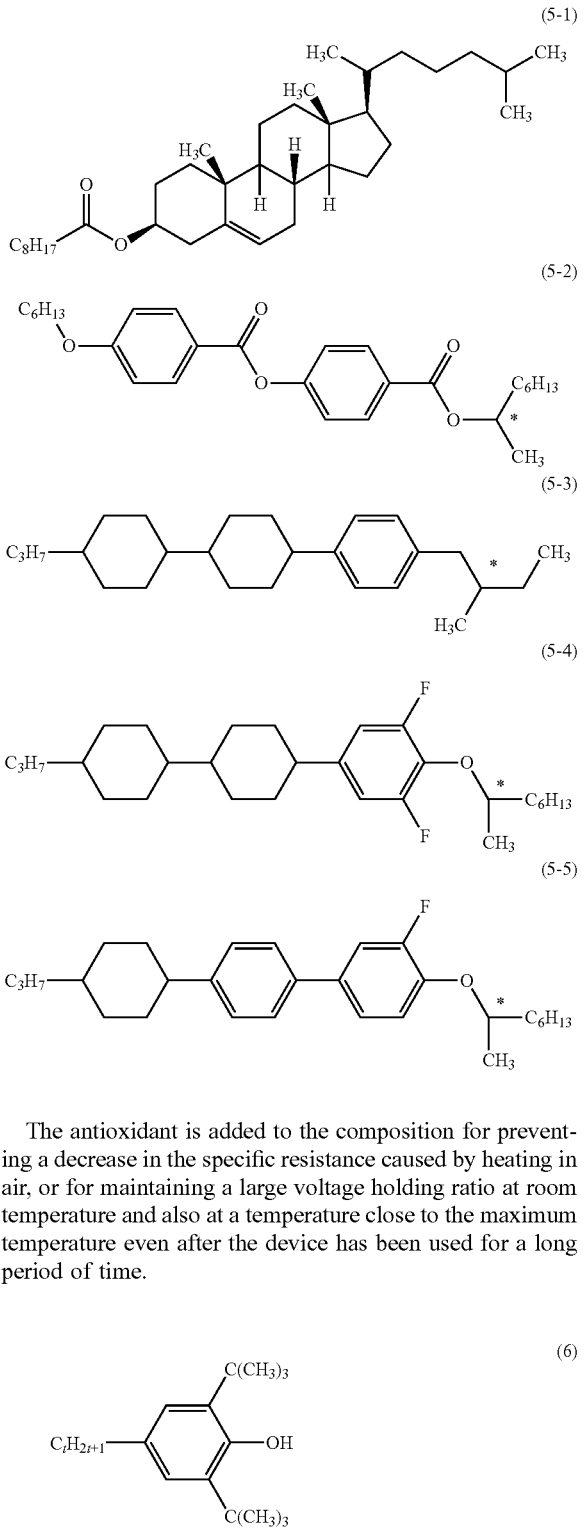

The antioxidant is added to the composition for preventing a decrease in the specific resistance caused by heating in air, or for maintaining a large voltage holding ratio at room temperature and also at a temperature close to the maximum temperature even after the device has been used for a long period of time.

Preferred examples of the antioxidant include compound (6) where t is an integer of 1 to 9. For compound (6), preferred t is 1, 3, 5, 7 or 9. Further preferred t is 1 or 7. Compound (6) of t=1 is effective in preventing a decrease in the specific resistance caused by heating in air, as having a large volatility. Compound (6) of t=7 is effective in maintaining a large voltage holding ratio at room temperature and also at a temperature close to the maximum temperature even after the device has been used for a long period of time, as having a small volatility. A preferred proportion of the antioxidant is about 50 ppm or more for achieving the effect thereof, and about 600 ppm or less for avoiding a decrease in the maximum temperature or avoiding an increase in the minimum temperature. A further preferred proportion is in the range of about 100 ppm to about 300 ppm.

Preferred examples of the UV light absorbent include a benzophenone derivative, a benzoate derivative and a triazole derivative. A light stabilizer such as an amine having steric hindrance is also preferred. A preferred proportion of the UV light absorbent or the stabilizer is about 50 ppm or more for achieving the effect thereof, and about 10,000 ppm or less for avoiding a decrease in the maximum temperature or avoiding an increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01 wt % to about 10 wt %. The antifoaming agent such as dimethyl silicone oil or methyl phenyl silicone oil is added to the composition for preventing foam formation. A preferred proportion of the antifoaming agent is about 1 ppm or more for achieving the effect thereof, and about 1,000 ppm or less for avoiding a poor display. A further preferred proportion is in the range of about 1 ppm to about 500 ppm.

The polymerizable compound is added to the composition to be adapted for an alignment film-less mode LCD device. Compound (2) is suitable for the purpose. Other polymerizable compound that is different from the compounds may be added to the composition together with compound (2). Preferred examples of other polymerizable compounds include acrylate, methacrylate, a vinyl compound, a vinyloxy compound, propenyl ether, an epoxy compound (oxirane, oxetane) and vinyl ketone. Further preferred examples include an acrylate derivative and a methacrylate derivative. When any other polymerizable compound is added thereto, a preferred proportion of compound (2) is about 10 wt % or more based on the total weight of the polymerizable compound. A further preferred proportion is about 50 wt % or more based on the same. A still further preferred proportion is about 80 wt % or more based on the same. A particularly preferred proportion is 100 wt % based on the same. A combination of compound (2) with other polymerizable compound at a suitable ratio improves the reactivity or achieve appropriate reactivity to form the alignment control layer together with compound (1), and thus the capability of aligning the liquid crystal molecules can be improved. Moreover, the combination can respond to a cell manufacture step in a wide range to improve poor performance such as unevenness and a decrease in contrast as caused in the manufacture step and to allow manufacture of a high-definition LCD device.

The polymerizable compound such as compound (2) is polymerized by irradiation with UV light, and may be polymerized in the presence of a suitable initiator such as a photo-polymerization initiator. Suitable conditions for polymerization, suitable types of the initiator and suitable amounts thereof are known to those of ordinary skill in the art and are described in the literature. For example, Irgacure 651™ (BASF), Irgacure 184™ (BASF) or Darocur 1173™

(BASF), each being a photoinitiator, is suitable for radical polymerization. A preferred proportion of the photopolymerization initiator is in the range of about 0.1 wt % to about 5 wt % based on the weight of the polymerizable compound. A further preferred proportion is in the range of about 1 wt % to about 3 wt %.

When the polymerizable compound such as compound (2) is stored, a polymerization inhibitor may be added thereto to prevent polymerization. The polymerizable compound is ordinarily added to the composition without removing the polymerization inhibitor. Examples of the polymerization inhibitor include hydroquinone, a hydroquinone derivative such as methylhydroquinone, 4-tert-butylcatechol, 4-methoxyphenol and phenothiazine.

Seventh, the methods for synthesizing the component compounds are described. The compounds can be prepared with known methods as exemplified below. Compound (1) may be used in the form of a commercial item, or be prepared by the methods in the literature such as *Tetrahedron Letters*, 23, 209-212 (1982), *Chem. Lett.*, 1541-1542 (1984), *Tetrahedron*, 38, 639-644 (1982), *J. Am. Chem. Soc.*, 78, 5084-5087, *Tetrahedron*, 43, 743-753 (1987), *J. Org. Chem.*, 54, 4088-4097 (1989) or *Makromol. Chem.*, 183, 2311-2321 (1982), and then used. Compounds (1-1-1-1), (1-1-1-3) and (1-1-3-1) are commercially available and are available from Tokyo Chemical Industry Co., Ltd. Compound (2) may be prepared by the method described in JP 2012-001526 A and then used. Compound (3-1) and (3-5) may be prepared by the method described in JP H2-503441 A. Compounds (4-1) and (4-5) may be prepared by the method described in JP S59-176221 A. A compound represented by formula (6) of t=1 is available from Sigma-Aldrich Corporation. Compound (6) of t=7 and so on may be prepared by the method described in U.S. Pat. No. 3,660,505B.

Any compounds whose synthetic methods are not described above can be prepared by the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Maruzen Co., Ltd.). The composition is prepared with publicly known methods using the thus obtained compounds. For example, the component compounds are mixed and dissolved in each other by heating.

Last, the application of the composition is described. Most of the compositions have a minimum temperature of about −10° C. or lower, a maximum temperature of about 70° C. or higher, and a Δn in the range of about 0.07 to about 0.20. The device including the composition has a large voltage holding ratio. The composition is suitable for use in an AM device. The composition is particularly suitable for use in a transmissive AM device. The composition having a Δn in the range of about 0.08 to about 0.25 may be prepared by controlling the ratio of the component compounds or by mixing with any other liquid crystal compound. The composition can be used as a composition having a nematic phase, or as an optically active composition by adding the optically active compound.

The composition can be used for an AM device. The composition can also be used for a PM device. The composition can also be used for an AM device and a PM device having a mode such as PC, TN, STN, ECB, OCB, IPS, VA or PSA. Use for an AM device having the PSA mode or particularly the alignment film-less mode are particularly preferred. The devices may be of a reflective type, a transmissive type or a transflective type. Use for the transmissive device is preferred. The composition can also be used for an amorphous silicon-TFT device or a polysilicon-TFT device.

One example of the method for manufacturing the alignment film-less mode liquid crystal display device is described below. A device having two substrates referred to as an array substrate and a color filter substrate is arranged. The substrates have no polyimide alignment control layer. At least one of the array substrate and the color filter substrate has an electrode layer. The liquid crystal compounds are mixed to prepare a liquid crystal composition. Compounds (1) and (2) are added to the composition. An additive may be added as required. The liquid crystal composition (or liquid crystal material) is injected into the device. The device is irradiated with light while a voltage is applied thereto. In the case of compounds (1) and (2), UV light is preferred. Compound (2) is polymerized by irradiation with light. Compounds (1) and (2) form the alignment control layer through the polymerization.

In the procedure, when the liquid crystal composition is injected into the device, compound (1) induces a vertical alignment of the liquid crystal. When a voltage is applied, the liquid crystal molecules are aligned by action of an electric field. The molecules of compounds (1) and (2) are also aligned according to the alignment. Compound (2) is polymerized by UV light in the state, and therefore the polymer in which the alignment is maintained is formed. The response time in the device is shortened by an effect of the polymer. The image persistence, which is caused by a poor operation of the liquid crystal molecules, is also simultaneously reduced by the effect of the polymer.

EXAMPLES

The invention will be described in more detail by way of Examples, but is not restricted thereto. For example, the invention includes a mixture of the composition of Example 1 and that of Example 2, and also a mixture in which at least two of the compositions of the Examples were mixed. A compound synthesized was identified by a method such as an NMR analysis. Characteristics of the compound and the composition were measured by the methods described below.

NMR analysis: For measurement, DRX-500 made by Bruker BioSpin Corporation was used. In $^1$H-NMR measurement, a sample was dissolved in a deuterated solvent such as $CDCl_3$, and the measurement was carried out under conditions of room temperature, 500 MHz and 16 times of accumulation. Tetramethylsilane was used as an internal standard. In $^{19}$F-NMR measurement, measurement was carried out under conditions of 24 times of accumulation using $CFCl_3$ as an internal standard. In the explanation of the NMR spectra, s, d, t, q, quin, sex and m stand for a singlet, a doublet, a triplet, a quartet, a quintet, a sextet and a multiplet, respectively, and br means being broad.

Gas chromatographic analysis: GC-14B gas chromatograph made by Shimadzu Corporation was used for the measurement. The carrier gas was helium (2 mL/min). The sample injector and the detector (FID) were set to 280° C. and 300° C., respectively. A capillary column DB-1 (length: 30 m, bore: 0.32 mm, film thickness: 0.25 μm; dimethylpolysiloxane as a stationary phase, non-polar) made by Agilent Technologies, Inc. was used to separating the component compounds. After the column was kept at 200° C. for 2 min, it was heated to 280° C. at a rate of 5° C./min. A sample was prepared in an acetone solution (0.1 wt %), and then 1 μL of the solution was injected into the sample injector. The recorder was C-R5A Chromatopac made by Shimadzu Corporation or an equivalent thereof. The resulting gas chromatogram showed a retention time of a peak and a peak area corresponding to each of the component compounds.

As a solvent for diluting the sample, chloroform, hexane and so forth may also be used. The following capillary columns may also be used to separate the component compounds: HP-1 (length: 30 m, bore: 0.32 mm, film thickness: 0.25 μm) made by Agilent Technologies, Inc., Rtx-1 (length: 30 m, bore: 0.32 mm, film thickness: 0.25 μm) made by Restek Corporation, and BP-1 (length: 30 m, bore: 0.32 mm, film thickness: 0.25 μm) made by SGE International Pty. Ltd. A capillary column CBP1-M50-025 (length: 50 m, bore: 0.25 mm, film thickness: 0.25 μm) made by Shimadzu Corporation may also be used for avoiding an overlap of peaks of the compounds.

The proportions of the liquid crystal compounds contained in the composition may be calculated by the method as described below. A mixture of the liquid crystal compounds was detected by gas chromatograph (FID). The ratio of the peak areas in the gas chromatogram corresponds to the ratio (weight ratio) of the liquid crystal compounds. When the capillary columns described above were used, a correction coefficient of each of the liquid crystal compounds may be regarded as 1 (one). Accordingly, the proportions (wt %) of the liquid crystal compounds can be calculated from the ratio of the peak areas.

Sample for measurement: When characteristics of a composition were to be measured, the composition was used as was. When characteristics of a compound were measured, a sample for measurement was prepared by mixing the compound (15 wt %) with a base liquid crystal (85 wt %). The values of characteristics of the compound were calculated using the values obtained by measurement, with an extrapolation method: "(extrapolated value)={(measured value of the sample for measurement)−0.85×(measured value of the base liquid crystal)}/0.15." When a smectic phase (or crystals) precipitated at the above ratio at 25° C., the ratio of the compound to the base liquid crystal was changed step by step in the order of (10 wt %: 90 wt %), (5 wt %: 95 wt %) and (1 wt %: 99 wt %). The values of the maximum temperature, the optical anisotropy, the viscosity and the dielectric anisotropy with regard to the compound were determined with the extrapolation method.

The base liquid crystal shown below was used. The proportion of each component compound was expressed in "weight percent" (wt %).

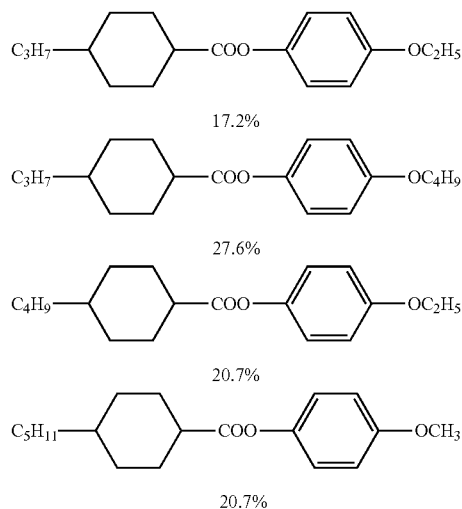

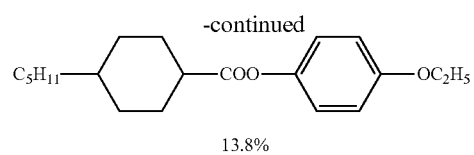

Measuring method: Characteristics were measured by methods described below. Most of the methods are applied as described in the standard "JEITA ED-2521B" discussed and established by the Japan Electronics and Information Technology Industries Association (JEITA), or as modified thereon. No thin film transistor (TFT) was attached to a TN device used for the measurement.

1) Maximum temperature of nematic phase (NI; ° C.): A sample was placed on a hot plate in a melting point apparatus equipped with a polarizing microscope and was heated at a rate of 1° C./min. The temperature at which a part of the sample began to change from a nematic phase to an isotropic liquid was measured. The higher limit of the temperature range of the nematic phase is occasionally abbreviated as "maximum temperature."

2) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as "$T_c$<−20° C." The lower limit of the temperature range of the nematic phase is occasionally abbreviated as "minimum temperature."

3) Viscosity (bulk viscosity; η; measured at 20° C.; mPa·s): A cone-plate (E type) rotational viscometer made by TOKYO KEIKI INC. was used for the measurement.

4) Viscosity (rotational viscosity; γ1; measured at 25° C.; mPa·s): The measurement was carried out with the method described in M. Imai et al., *Molecular Crystals and Liquid Crystals*, Vol. 259, p. 37 (1995). A sample was put in a VA device in which the distance (cell gap) between two glass substrates was 20 μm. Voltage was applied stepwise to the device in the range of 39 V to 50 V at an increment of 1 V. After 0.2 sec with no voltage application, a voltage was applied repeatedly under conditions of only one rectangular wave (rectangular pulse; 0.2 sec) and no application (2 sec). The peak current and the peak time of a transient current generated by the applied voltage were measured. The value of rotational viscosity was obtained from the measured values with Equation (8) on page 40 of the paper of M. Imai et al. The value of dielectric anisotropy required for the calculation was measured by the method described in section 6) below.

5) Optical anisotropy (refractive index anisotropy; Δn; measured at 25° C.): The measurement was carried out by an Abbe refractometer with a polarizing plate mounted on an ocular, using light at a wavelength of 589 nm. The surface of a main prism was rubbed in one direction, and then a sample was added dropwise onto the main prism. The refractive index $n_{//}$ was measured when the direction of polarized light was parallel to the direction of rubbing. The refractive index $n_\perp$ was measured when the direction of polarized light was perpendicular to the direction of rubbing. The value of optical anisotropy was calculated from the equation "$\Delta n = n_{//} - n_\perp$."

6) Dielectric anisotropy (Δ∈; measured at 25° C.): The value of dielectric anisotropy was calculated by the equation "$\Delta\epsilon=\epsilon_{//}-\epsilon_{\perp}$." The dielectric constants $\epsilon_{//}$ and $\epsilon_{\perp}$ were measured as described below.

i) Measurement of dielectric constant $\epsilon_{//}$: An ethanol (20 mL) solution of octadecyl triethoxysilane (0.16 mL) was applied to a well-cleaned glass substrate. After rotating the glass substrate with a spinner, the glass substrate was heated at 150° C. for 1 hour. A sample was put in a VA device in which the distance (cell gap) between two glass substrates was 4 μm, and the device was sealed with a UV-curable adhesive. Sine waves (0.5 V, 1 kHz) were applied to the device, and after 2 sec, the dielectric constant $\epsilon_{//}$ in the major axis direction of liquid crystal molecules was measured.

ii) Measurement of dielectric constant $\epsilon_{\perp}$: A polyimide solution was applied to a well-cleaned glass substrate. After the glass substrate was calcined, a rubbing treatment was applied to the alignment film obtained. A sample was put in a TN device in which the distance (cell gap) between two glass substrates was 9 μm and the twist angle was 80°. Sine waves (0.5 V, 1 kHz) were applied to the device, and after 2 sec, the dielectric constant $\epsilon_{\perp}$ in the minor axis direction of the liquid crystal molecules was measured.

7) Threshold voltage (Vth; measured at 25° C.; V): An LCD-5100 luminance meter made by Otsuka Electronics Co., Ltd. was used for the measurement. The light source was a halogen lamp. A sample was put in a normally black mode VA device in which the distance (cell gap) between two glass substrates was 4 μm and the rubbing direction was anti-parallel, and the device was sealed with a UV-curable adhesive. A voltage (60 Hz, rectangular waves) was applied to the device, stepwise increasing from 0 V to 20 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. The threshold voltage is expressed in terms of the voltage at 10% transmittance.

8) Voltage holding ratio (VHR-1a; at 25° C.; %): A TN device used for the measurement had a polyimide alignment film and a distance (cell gap) between two glass substrates of 5 μm. A sample was put in the device, and then the device was sealed with a UV-curable adhesive. A pulse voltage (60 μs at 5 V) was applied to the TN device to charge the device. A decaying voltage was measured for 166.7 milliseconds with a high-speed voltmeter, and area A between the voltage curve and the horizontal axis in a unit cycle was determined. The voltage holding ratio is expressed in terms of the percentage of area A to area B that was the area without decay.

9) Voltage holding ratio (VHR-2a; measured at 60° C.; %): A voltage holding ratio was measured in a procedure identical with the procedure described above except that the voltage holding ratio was measured at 60° C. instead of 25° C. The values obtained were expressed as VHR-2a. A composition containing a polymerizable compound was irradiated with UV light having an intensity of 25 mW/cm² for 400 sec, while a voltage of 15V was applied to the TN device, to cause polymerization. A mercury-xenon lamp, EXECURE4000-D, made by HOYA CANDEO OPTRONICS Corporation was used for the irradiation with UV light.

10) Voltage holding ratio (VHR-3a; measured at 60° C.; %): The stability to UV light was evaluated by measuring a voltage holding ratio after a device was US-irradiated. The TN device used for the measurement had a polyimide alignment film and a cell gap of 5 μm. A sample was injected into the device, and then irradiated with light for 167 min. The light source was a black light (peak wavelength: 369 nm), and the distance between the device and the light source was 5 mm. In measuring VHR-3a, the decaying voltage was measured for 166.7 milliseconds. In a composition containing a polymerizable compound, polymerization was caused under conditions described in section 9). A composition having a large VHR-3a has a large stability to UV light.

11) Voltage holding ratio (VHR-4a; measured at 25° C.; %): A TN device into which a sample was injected was heated in a constant-temperature bath at 80° C. for 500 hours, and then the stability to heat was evaluated by measuring a voltage holding ratio. In measuring VHR-4a, a decaying voltage was measured for 166.7 milliseconds. A composition having a large VHR-4a has a large stability to heat.

12) Response time (τ; measured at 25° C.; ms): An LCD-5100 luminance meter made by Otsuka Electronics Co., Ltd. was used for the measurement. The light source was a halogen lamp. A low-pass filter was set at 5 kHz.

i) A composition containing no compound (1) and no polymerizable compound: A sample was put in a normally black mode VA device in which the distance (cell gap) between two glass substrates was 4 μm and the rubbing direction was anti-parallel. Then the device was sealed using a UV-curable adhesive. Rectangular waves (60 Hz, 10 V, 0.5 second) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. The response time was expressed in terms of time required for a change from 90% transmittance to 10% transmittance (fall time; millisecond).

ii) A composition containing compound (1) and a polymerizable compound: A sample was put in a normally black mode PVA device in which the distance (cell gap) between two glass substrates was 3.2 μm and the rubbing direction was anti-parallel. Then, the device was sealed with a UV-curable adhesive. The device was irradiated with UV light having an intensity of 25 mW/cm² for 400 sec while a voltage of 15 V was applied to the device. A mercury-xenon lamp, EXECURE4000-D, made by HOYA CANDEO OPTRONICS Corporation was used for the irradiation with UV light. Rectangular waves (60 Hz, 10 V, 0.5 sec) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. The response time was expressed in terms of time required for a change from 10% transmittance to 90% transmittance (rise time; millisecond).

13) Specific resistance (ρ; measured at 25° C.; Ω·cm): Into a vessel equipped with electrodes, 1.0 mL of a sample was injected. A DC voltage (10 V) was applied to the vessel, and the DC current after 10 sec was measured. The specific resistance ρ was calculated from the equation "ρ={(voltage)×(electric capacity of a vessel)}/{(direct current)×(dielectric constant of vacuum)}."

14) Residual monomer concentration (ReM; wt %); A sample was prepared by adding a predetermined amount of polymerizable compound to 100 wt % of a liquid crystal composition and dissolving the polymerizable compound to the composition. The sample was injected into a cell with ITO having no polyimide-alignment film in which the cell gap was 3.5 μm. The cell was irradiated with UV light having an intensity of 80 mW/cm² for 375 sec while a voltage of 15 V was applied to the cell. An EYE Cure UV Light System made by EYE GRAPHICS CO., LTD. was used for irradiation with UV light. Then, a residual monomer concentration was measured by HPLC.

The compounds in Comparative Examples and Examples were described using symbols according to definitions in Table 3 below. In Table 3, the configuration of 1,4-cyclohexylene is trans. The parenthesized number next to a symbolized compound corresponds to the number of the compound. The symbol "(-)" means any other liquid crystal compound. The proportion (percentage) of a liquid crystal compound is expressed in terms of weight percent (wt %) based on the weight of the liquid crystal composition.

TABLE 3

| Method for Description of Compounds using Symbols R—(A₁)—Z₁— . . . —Zₙ—(Aₙ)—R' | |
|---|---|
| 1) Left-terminal Group R— | Symbol |
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| $CH_2$=CHCOO— | AC— |
| $CH_2$=C($CH_3$)COO— | MAC— |
| $CH_2$=CHOCOO— | VCA |
| $CH_2$=CHCH₂OCOO— | ACA— |
| 2) Right-terminal Group —R' | Symbol |
| —$C_nH_{2n+1}$ | -n |
| —$OC_nH_{2n+1}$ | —On |
| —CH=CH₂ | —V |
| —CH=CH—$C_nH_{2n+1}$ | —Vn |
| —$C_nH_{2n}$—CH=CH₂ | —nV |
| —CH=CF₂ | —VFF |
| —COOCH₃ | —EMe |
| —OCOCH=CH₂ | —AC |
| —OCOC(CH₃)=CH₂ | —MAC |
| 3) Bonding Group —Zₙ— | Symbol |
| —$C_nH_{2n+1}$— | n |
| —COO— | E |
| —CH=CH—O— | VO |
| —O—CH=CH— | OV |
| —CH=CH— | V |
| —CF₂O— | X |
| —OCH₂— | O1 |
| —CH₂O— | 1O |
| —O— | O |
| 4) Ring Structure —Aₙ— | Symbol |
|  | H |
| 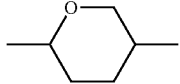 | Dh |

TABLE 3-continued

| Method for Description of Compounds using Symbols R—(A₁)—Z₁— . . . —Zₙ—(Aₙ)—R' | |
|---|---|
|  | dh |
|  | B |
| 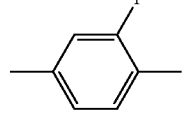 | B(F) |
| 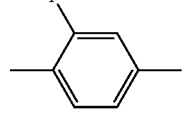 | B(2F) |
| 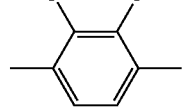 | B(2F,3F) |
| 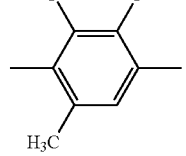 | B(2F,3F,6Me) |
| 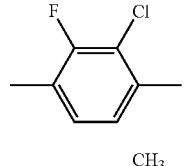 | B(2F,3CL) |
|  | B(Me) |
| 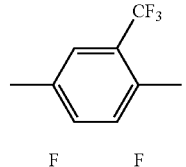 | B(CF3) |
| 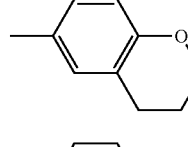 | Cro(7F,8F) |
| 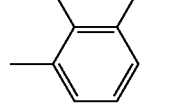 | Np(1,5) |

TABLE 3-continued

Method for Description of Compounds using Symbols
R—(A₁)—Z₁— . . . —Zₙ—(Aₙ)—R'

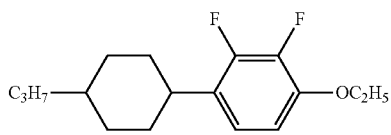

Np(2,6)

5) Examples of Description

Example 1 3-HB(2F,3F)—O2

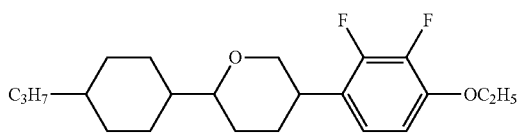

Example 2 3-HDhB(2F,3F)-O2

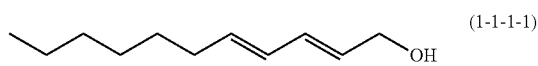

Comparison of Compatibility Between Alignment Control Material and any Other Liquid Crystal Composition Examples 1 to 7, and Comparative Examples 1 to 5

LC-A being a liquid crystal composition (pre-addition composition) containing neither a first component nor a second component of the invention was prepared. Components and characteristics of the composition are as described below.

LC-A

| | | |
|---|---|---|
| 3-H1OB(2F,3F)-O2 | (3-3) | 4% |
| V2-BB(2F,3F)-O1 | (3-4) | 5% |
| V2-BB(2F,3F)-O2 | (3-4) | 9% |
| 1V2-BB(2F,3F)-O2 | (3-4) | 6% |
| V-HHB(2F,3F)-O1 | (3-6) | 3% |
| V-HHB(2F,3F)-O2 | (3-6) | 10% |
| 3-HH1OB(2F,3F)-O2 | (3-8) | 11% |
| 2-BB(2F,3F)B-3 | (3-9) | 9% |
| 3-HH-V | (4-1) | 27% |
| 3-HH-V1 | (4-1) | 9% |
| 3-HHB-O1 | (4-5) | 3% |
| V-HHB-1 | (4-5) | 4% |

NI=75.6° C.; Δn=0.111; Δ∈=−3.1.

To 100 wt % of pre-addition composition LC-A described above, a predetermined amount of a compound selected from compounds (1-1-1-1), (1-1-1-3) and (1-1-3-1), a predetermined amount of compound (7), and a predetermined amount of compound (2-1-1-1) were added, and the resulting mixture was heated at 120° C. for 5 min to give post-addition compositions PLC-A-1 to PLC-A-12. In addition, compound (7) is a polymerizable compound disclosed in Patent literature No. 9.

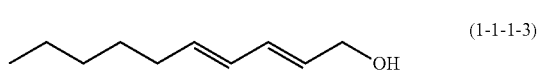 (1-1-1-1)

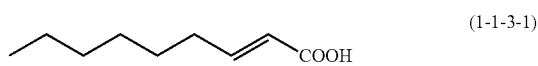 (1-1-1-3)

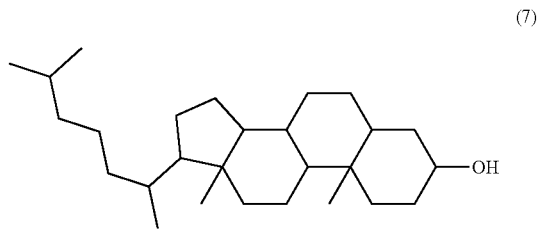 (1-1-3-1)

(7)

(2-1-1-1)

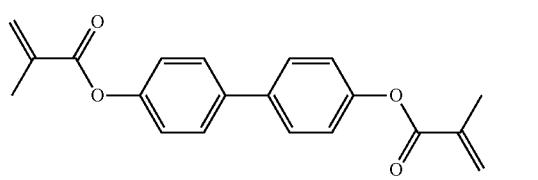

A solubility evaluation was performed on all of the post-addition compositions. The evaluation results were shown in Table 4. In addition, in the solubility evaluation, the liquid crystal composition in a glass vial was allowed to stand still at a predetermined temperature for one week, and then presence or absence of precipitation of a crystal was confirmed by visual observation. In table 4, the symbol "○" means no finding of the crystal, and the symbol "x" means finding of the crystal.

TABLE 4

| | | Compound (1) or Compound (7) | | Compound (2) | | Evaluation Results of Compatibility | |
|---|---|---|---|---|---|---|---|
| | Post-Addition Composition | Compound formula number | Addition proportion (wt %) | Compound formula number | Addition proportion (wt %) | Still standing temperature = 25° C. | Still standing temperature = 0° C. |
| Example 1 | PLC-A-1 | 1-1-1-1 | 1.00 | 2-1-1-1 | 0.50 | ○ | ○ |
| Example 2 | PLC-A-2 | 1-1-1-1 | 2.00 | 2-1-1-1 | 0.50 | ○ | ○ |
| Example 3 | PLC-A-3 | 1-1-1-1 | 3.00 | 2-1-1-1 | 0.50 | ○ | ○ |
| Example 4 | PLC-A-4 | 1-1-1-1 | 4.00 | 2-1-1-1 | 0.50 | ○ | ○ |
| Example 5 | PLC-A-5 | 1-1-1-1 | 5.00 | 2-1-1-1 | 0.50 | ○ | ○ |
| Example 6 | PLC-A-6 | 1-1-1-3 | 3.00 | 2-1-1-1 | 0.50 | ○ | ○ |
| Example 7 | PLC-A-7 | 1-1-3-1 | 3.00 | 2-1-1-1 | 0.50 | ○ | ○ |

TABLE 4-continued

| | Post-Addition Composition | Compound (1) or Compound (7) | | Compound (2) | | Evaluation Results of Compatibility | |
|---|---|---|---|---|---|---|---|
| | | Compound formula number | Addition proportion (wt %) | Compound formula number | Addition proportion (wt %) | Still standing temperature = 25° C. | Still standing temperature = 0° C. |
| Comparative Example 1 | PLC-A-8 | 7 | 1.00 | 2-1-1-1 | 0.50 | ○ | ○ |
| Comparative Example 2 | PLC-A-9 | 7 | 2.00 | 2-1-1-1 | 0.50 | ○ | ○ |
| Comparative Example 3 | PLC-A-10 | 7 | 3.00 | 2-1-1-1 | 0.50 | x | x |
| Comparative Example 4 | PLC-A-11 | 7 | 4.00 | 2-1-1-1 | 0.50 | x | x |
| Comparative Example 5 | PLC-A-12 | 7 | 5.00 | 2-1-1-1 | 0.50 | x | x |

In comparison between Examples 1 to 7 and Comparative Examples 1 to 5 in Table 4, the liquid crystal compositions (post-addition compositions) according to the invention are found to have better compatibility in comparison with a known liquid crystal composition for alignment film-less use.

Examples 8 to 19, and Comparative Examples 6 to 17

Compositions LC-B to LC-M being liquid crystal compositions (pre-addition compositions) containing neither a first component nor a second component of the invention were prepared. Components and characteristics of the composition are as described below.

LC-B

| 3-H1OB(2F,3F)-O2 | (3-3) | 8% |
|---|---|---|
| V2-BB(2F,3F)-O1 | (3-4) | 5% |
| V2-BB(2F,3F)-O2 | (3-4) | 9% |
| 1V2-BB(2F,3F)-O4 | (3-4) | 6% |
| V-HHB(2F,3F)-O2 | (3-6) | 10% |
| V-HHB(2F,3F)-O4 | (3-6) | 3% |
| 1V2-HHB(2F,3F)-O2 | (3-6) | 4% |
| 3-HH1OB(2F,3F)-O2 | (3-8) | 11% |
| 3-HH-V | (4-1) | 26% |
| 1-HH-2V1 | (4-1) | 5% |
| 5-HB-O2 | (4-2) | 4% |
| 3-HHB-O1 | (4-5) | 5% |
| V-HHB-1 | (4-5) | 4% |

NI=74.0° C.; Δn=0.101; Δ∈=−3.4.

LC-C

| 3-BB(2F,3F)-O2 | (3-4) | 9% |
|---|---|---|
| 2O-BB(2F,3F)-O2 | (3-4) | 3% |
| 2-HH1OB(2F,3F)-O2 | (3-8) | 10% |
| 3-HH1OB(2F,3F)-O2 | (3-8) | 20% |
| 2-BB(2F,3F)B-4 | (3-9) | 3% |
| 2-HH-3 | (4-1) | 19% |
| 3-HH-4 | (4-1) | 4% |
| 3-HH-V | (4-1) | 8% |
| V2-BB-1 | (4-3) | 3% |
| 1-BB-3 | (4-3) | 6% |
| V-HHB-3 | (4-5) | 5% |
| 3-HBB-2 | (4-6) | 4% |
| 5-B(F)BB-2 | (4-7) | 3% |
| 5-HBBH-3 | (4-11) | 3% |

NI=83.6° C.; Δn=0.108; Δ∈=−2.8.

LC-D

| 3-BB(2F,3F)-O2 | (3-4) | 10% |
|---|---|---|
| 5-BB(2F,3F)-O4 | (3-4) | 3% |
| 2-HH1OB(2F,3F)-O2 | (3-8) | 10% |
| 3-HH1OB(2F,3F)-O2 | (3-8) | 22% |
| 2-HH-3 | (4-1) | 21% |
| 3-HH-V | (4-1) | 8% |
| 1-BB-3 | (4-3) | 8% |
| 1V2-BB-1 | (4-3) | 3% |
| V2-HHB-1 | (4-5) | 5% |
| 3-HBB-2 | (4-6) | 4% |
| 5-B(F)BB-3 | (4-7) | 3% |
| 1O1-HBBH-4 | (—) | 3% |

NI=78.6° C.; Δn=0.107; Δ∈=−2.6.

LC-E

| V2-BB(2F,3F)-O2 | (3-4) | 12% |
|---|---|---|
| 1V2-BB(2F,3F)-O2 | (3-4) | 6% |
| 1V2-BB(2F,3F)-O4 | (3-4) | 3% |
| V-HHB(2F,3F)-O1 | (3-6) | 6% |
| V-HHB(2F,3F)-O2 | (3-6) | 12% |
| V-HHB(2F,3F)-O4 | (3-6) | 5% |
| 3-HDhB(2F,3F)-O2 | (3-11) | 5% |
| 3-dhBB(2F,3F)-O2 | (3-14) | 4% |
| 3-HH-V | (4-1) | 30% |
| 1-BB-3 | (4-3) | 6% |
| V-HHB-1 | (4-5) | 5% |
| 1-BB(F)B-2V | (4-8) | 3% |
| 3-HHEBH-4 | (4-9) | 3% |

NI=77.4° C.; Δn=0.112; Δ∈=−2.9.

LC-F

| V2-BB(2F,3F)-O2 | (3-4) | 12% |
|---|---|---|
| 1V2-BB(2F,3F)-O2 | (3-4) | 6% |
| 1V2-BB(2F,3F)-O4 | (3-4) | 3% |
| V-HHB(2F,3F)-O1 | (3-6) | 6% |
| V-HHB(2F,3F)-O2 | (3-6) | 7% |
| V-HHB(2F,3F)-O4 | (3-6) | 5% |
| 1V2-HHB(2F,3F)-O4 | (3-6) | 5% |
| 3-HDhB(2F,3F)-O2 | (3-11) | 5% |
| 3-dhBB(2F,3F)-O2 | (3-14) | 5% |
| 3-HH-V | (4-1) | 29% |
| V2-HB-1 | (4-2) | 6% |
| V-HHB-1 | (4-5) | 5% |
| 2-BB(F)B-5 | (4-8) | 3% |
| 5-HBB(F)B-3 | (4-13) | 3% |

NI=79.0° C.; Δn=0.112; Δ∈=−2.9.

LC-G

| | | |
|---|---|---|
| 3-HB(2F,3F)-O2 | (3-1) | 3% |
| V2-BB(2F,3F)-O2 | (3-4) | 11% |
| 1V2-BB(2F,3F)-O2 | (3-4) | 6% |
| V2-HHB(2F,3F)-O2 | (3-6) | 5% |
| 3-HDhB(2F,3F)-O2 | (3-11) | 5% |
| 3-HBB(2F,3F)-O2 | (3-13) | 3% |
| V-HBB(2F,3F)-O2 | (3-13) | 6% |
| V2-HBB(2F,3F)-O2 | (3-13) | 6% |
| 3-dhBB(2F,3F)-O2 | (3-14) | 5% |
| 5-HH-O1 | (4-1) | 4% |
| 3-HH-V | (4-1) | 25% |
| 3-HH-VFF | (4-1) | 3% |
| 1-BB-3 | (4-3) | 6% |
| 3-HHEH-3 | (4-4) | 3% |
| V-HHB-1 | (4-5) | 6% |
| V2-HHB-1 | (4-5) | 3% |

NI=75.3° C.; Δn=0.113; Δ∈=−2.5.

LC-H

| | | |
|---|---|---|
| V2-BB(2F,3F)-O2 | (3-4) | 10% |
| 1V2-BB(2F,3F)-O2 | (3-4) | 4% |
| 1V2-BB(2F,3F)-O4 | (3-4) | 4% |
| V-HHB(2F,3F)-O1 | (3-6) | 6% |
| V-HHB(2F,3F)-O2 | (3-6) | 10% |
| V-HHB(2F,3F)-O4 | (3-6) | 5% |
| 3-DhH1OB(2F,3F)-O2 | (3-12) | 3% |
| 3-HHB(2F,3CL)-O2 | (3-16) | 3% |
| 5-HBB(2F,3CL)-O2 | (3-17) | 3% |
| 3-H1OCro(7F,8F)-5 | (3-18) | 3% |
| 3-HH1OCro(7F,8F)-5 | (3-19) | 3% |
| 3-HH-V | (4-1) | 29% |
| 1-BB-3 | (4-3) | 6% |
| V-HHB-1 | (4-5) | 7% |
| 3-HBB-2 | (4-6) | 4% |

NI=74.5° C.; Δn=0.105; Δ∈=−3.0.

LC-I

| | | |
|---|---|---|
| V2-HB(2F,3F)-O2 | (3-1) | 5% |
| 3-H2B(2F,3F)-O2 | (3-2) | 9% |
| V-HHB(2F,3F)-O2 | (3-6) | 12% |
| 2-HH1OB(2F,3F)-O2 | (3-8) | 7% |
| 3-HH1OB(2F,3F)-O2 | (3-8) | 12% |
| 3-HDhB(2F,3F)-O2 | (3-11) | 3% |
| 2-HH-3 | (4-1) | 27% |
| 3-HH-4 | (4-1) | 4% |
| 1-BB-3 | (4-3) | 9% |
| 3-HHB-1 | (4-5) | 3% |
| 3-B(F)BB-2 | (4-7) | 3% |
| 3-HB(F)HH-5 | (4-10) | 3% |
| 3-HB(F)BH-3 | (4-12) | 3% |

NI=79.9° C.; Δn=0.092; Δ∈=−2.9.

LC-J

| | | |
|---|---|---|
| 1V2-HB(2F,3F)-O2 | (3-1) | 5% |
| 5-H2B(2F,3F)-O2 | (3-2) | 9% |
| 5-HHB(2F,3F)-O2 | (3-6) | 3% |
| V-HHB(2F,3F)-O2 | (3-6) | 6% |
| 2-HH1OB(2F,3F)-O2 | (3-8) | 7% |
| 3-HH1OB(2F,3F)-O2 | (3-8) | 12% |
| 2-BB(2F,3F)B-3 | (3-9) | 3% |
| 2-HHB(2F,3CL)-O2 | (3-16) | 3% |
| 4-HHB(2F,3CL)-O2 | (3-16) | 3% |
| 2-HH-3 | (4-1) | 22% |
| 3-HH-V | (4-1) | 8% |
| 1-BB-3 | (4-3) | 10% |
| 3-HHB-1 | (4-5) | 3% |
| 3-HB(F)HH-5 | (4-10) | 3% |
| 3-HB(F)BH-3 | (4-12) | 3% |

NI=80.5° C.; Δn=0.093; Δ∈=−2.9.

LC-K

| | | |
|---|---|---|
| 3-HB(2F,3F)-O4 | (3-1) | 5% |
| V-HB(2F,3F)-O2 | (3-1) | 4% |
| V2-BB(2F,3F)-O2 | (3-4) | 7% |
| 1V2-BB(2F,3F)-O2 | (3-4) | 6% |
| 2O-B(2F,3F)B(2F,3F)-O6 | (3-5) | 3% |
| V-HHB(2F,3F)-O2 | (3-6) | 10% |
| 3-HH2B(2F,3F)-O2 | (3-7) | 3% |
| 3-HH1OB(2F,3F)-O2 | (3-8) | 10% |
| 2-BB(2F,3F)B-3 | (3-9) | 6% |
| 3-HH-V | (4-1) | 27% |
| 4-HH-V1 | (4-1) | 6% |
| 3-HH-2V1 | (4-1) | 3% |
| 3-HBB-2 | (4-6) | 7% |
| 5-HBB(F)B-2 | (4-13) | 3% |

NI=79.2° C.; Δn=0.112; Δ∈=−3.1.

LC-L

| | | |
|---|---|---|
| 3-HB(2F,3F)-O2 | (3-1) | 5% |
| V-HB(2F,3F)-O4 | (3-1) | 4% |
| 5-BB(2F,3F)-O2 | (3-4) | 6% |
| V2-BB(2F,3F)-O2 | (3-4) | 7% |
| 3-B(2F,3F)B(2F,3F)-O2 | (3-5) | 3% |
| V-HHB(2F,3F)-O2 | (3-6) | 10% |
| 3-HH1OB(2F,3F)-O2 | (3-8) | 10% |
| 2-BB(2F,3F)B-3 | (3-9) | 5% |
| 4-HBB(2F,3F)-O2 | (3-13) | 3% |
| 3-HBB(2F,3CL)-O2 | (3-17) | 3% |
| 3-HH-O1 | (4-1) | 3% |
| 3-HH-V | (4-1) | 24% |
| 3-HB-O2 | (4-2) | 3% |
| V-HHB-1 | (4-5) | 7% |
| 3-BB(F)B-5 | (4-8) | 3% |
| 5-HBB(F)B-2 | (4-13) | 4% |

NI=77.7° C.; Δn=0.117; Δ∈=−3.1.

LC-M

| | | |
|---|---|---|
| 3-BB(2F,3F)-O4 | (3-4) | 5% |
| V2-BB(2F,3F)-O2 | (3-4) | 12% |
| 1V2-BB(2F,3F)-O1 | (3-4) | 4% |
| 3-HHB(2F,3F)-O2 | (3-6) | 5% |
| V-HHB(2F,3F)-O1 | (3-6) | 6% |
| V-HHB(2F,3F)-O2 | (3-6) | 12% |
| 3-DhHB(2F,3F)-O2 | (3-10) | 5% |
| 3-HEB(2F,3F)B(2F,3F)-O2 | (3-15) | 5% |
| 3-HH-V | (4-1) | 23% |
| 4-HH-V | (4-1) | 3% |
| 5-HH-V | (4-1) | 6% |
| 7-HB-1 | (4-2) | 3% |
| V-HHB-1 | (4-5) | 5% |
| 3-HBB-2 | (4-6) | 3% |
| 2-BB(F)B-3 | (4-8) | 3% |

NI=76.3° C.; Δn=0.104; Δ∈=−3.0.

The compatibility of the liquid crystal compositions (post-addition compositions) according to the invention were evaluated using pre-addition compositions LC-B to LC-M prepared by the procedure described above in a manner similar to the procedure in Example 1. The results are shown in Table 5.

TABLE 5

| | Post-Addition Composition number | Pre-Addition Composition number | Compound (1) or Compound (7) | | Compound (2) | | Evaluation Results of Compatibility | |
|---|---|---|---|---|---|---|---|---|
| | | | Compound formula number | Addition proportion (wt %) | Compound formula number | Addition proportion (wt %) | Still standing temperature = 25° C. | Still standing temperature = 0° C. |
| Example 8 | PLC-B-1 | LC-B | 1-1-1-1 | 3.00 | 2-1-1-1 | 0.50 | ○ | ○ |
| Example 9 | PLC-C-1 | LC-C | 1-1-1-1 | 3.00 | 2-1-1-1 | 0.50 | ○ | ○ |
| Example 10 | PLC-D-1 | LC-D | 1-1-1-1 | 3.00 | 2-1-1-1 | 0.50 | ○ | ○ |
| Example 11 | PLC-E-1 | LC-E | 1-1-1-1 | 3.00 | 2-1-1-1 | 0.50 | ○ | ○ |
| Example 12 | PLC-F-1 | LC-F | 1-1-1-1 | 3.00 | 2-1-1-1 | 0.50 | ○ | ○ |
| Example 13 | PLC-G-1 | LC-G | 1-1-1-1 | 3.00 | 2-1-1-1 | 0.50 | ○ | ○ |
| Example 14 | PLC-H-1 | LC-H | 1-1-1-1 | 3.00 | 2-1-1-1 | 0.50 | ○ | ○ |
| Example 15 | PLC-I-1 | LC-I | 1-1-1-1 | 3.00 | 2-1-1-1 | 0.50 | ○ | ○ |
| Example 16 | PLC-J-1 | LC-J | 1-1-1-1 | 3.00 | 2-1-1-1 | 0.50 | ○ | ○ |
| Example 17 | PLC-K-1 | LC-K | 1-1-1-1 | 3.00 | 2-1-1-1 | 0.50 | ○ | ○ |
| Example 18 | PLC-L-1 | LC-L | 1-1-1-1 | 3.00 | 2-1-1-1 | 0.50 | ○ | ○ |
| Example 19 | PLC-M-1 | LC-M | 1-1-1-1 | 3.00 | 2-1-1-1 | 0.50 | ○ | ○ |
| Comparative Example 6 | PLC-B-2 | LC-B | 7 | 3.00 | 2-1-1-1 | 0.50 | x | x |
| Comparative Example 7 | PLC-C-2 | LC-C | 7 | 3.00 | 2-1-1-1 | 0.50 | x | x |
| Comparative Example 8 | PLC-D-2 | LC-D | 7 | 3.00 | 2-1-1-1 | 0.50 | x | x |
| Comparative Example 9 | PLC-E-2 | LC-E | 7 | 3.00 | 2-1-1-1 | 0.50 | x | x |
| Comparative Example 10 | PLC-F-2 | LC-F | 7 | 3.00 | 2-1-1-1 | 0.50 | x | x |
| Comparative Example 11 | PLC-G-2 | LC-G | 7 | 3.00 | 2-1-1-1 | 0.50 | x | x |
| Comparative Example 12 | PLC-H-2 | LC-H | 7 | 3.00 | 2-1-1-1 | 0.50 | x | x |
| Comparative Example 13 | PLC-I-2 | LC-I | 7 | 3.00 | 2-1-1-1 | 0.50 | x | x |
| Comparative Example 14 | PLC-J-2 | LC-J | 7 | 3.00 | 2-1-1-1 | 0.50 | x | x |
| Comparative Example 15 | PLC-K-2 | LC-K | 7 | 3.00 | 2-1-1-1 | 0.50 | x | x |
| Comparative Example 16 | PLC-L-2 | LC-L | 7 | 3.00 | 2-1-1-1 | 0.50 | x | x |
| Comparative Example 17 | PLC-M-2 | LC-M | 7 | 3.00 | 2-1-1-1 | 0.50 | x | x |

The results in Table 5 show that various types of the liquid crystal compositions containing compounds (1-1-1) and (2-1-1) according to the invention can give better compatibility in comparison with the liquid crystal compositions containing known alignment control compound (7) for alignment film-less use, and compound (2-1-1)

Comparison of Residual Monomer Concentration Examples 20 to 23 and Comparative Example 18

Measurement was carried out on a residual monomer concentration (ReM) after exposure to UV light for post-addition compositions PLC-A-1 to PLC-A-13 as prepared in a manner similar to the technique in Example 1. The results are shown in Table 6.

TABLE 6

| | Post-Addition Composition number | Pre-Addition Composition number | Compound (1) or Compound (7) | | Compound (2) | | Residual Monomer |
|---|---|---|---|---|---|---|---|
| | | | Compound formula number | Addition proportion (wt %) | Compound formula number | Addition proportion (wt %) | Concentration after Exposure to UV (wt %) |
| Example 20 | PLC-A-1 | LC-A | 1-1-1-1 | 1.00 | 2-1-1-1 | 0.50 | 0.37 |
| Example 21 | PLC-A-2 | LC-A | 1-1-1-1 | 2.00 | 2-1-1-1 | 0.50 | 0.38 |
| Example 22 | PLC-A-6 | LC-A | 1-1-1-3 | 1.00 | 2-1-1-1 | 0.50 | 0.35 |
| Example 23 | PLC-A-13 | LC-A | 1-1-1-3 | 2.00 | 2-1-1-1 | 0.50 | 0.35 |
| Comparative Example 18 | PLC-A-8 | LC-A | 7 | 1.00 | 2-1-1-1 | 0.50 | 0.47 |

Table 6 shows that the liquid crystal compositions according to the invention in which alignment control compound (1-1-1-1) or (1-1-1-3) for alignment film-less use was used have a lower residual concentration of the polymerizable compound in comparison with the liquid crystal composition using known alignment control compound (7) for alignment film-less use. More specifically, the liquid crystal compositions for alignment film-less use according to the invention have higher reactivity with polymerizable compound (2) in comparison with the known liquid crystal composition for alignment film-less use. The results show that the alignment control compounds for alignment film-less use of the invention have an effect on promoting a reaction of polymerizable compound (2).

Comparison of Vertical Liquid Crystal Alignment Properties Examples 24 and 25, and Comparative Examples 19 and 20

Vertical liquid crystal alignment properties of post-addition compositions PLC-A-2 to PLC-A-12 prepared by the above methods above were evaluated. The results are shown in Table 7. The vertical liquid crystal alignment properties were evaluated as described below. A sample was injected into a cell with ITO having no polyimide-alignment film in which the cell gap was 3.5 µm. The cell was irradiated with UV light having an intensity of 80 mW/cm² for 375 sec while a voltage of 15 V was applied to the cell. An EYE Cure UV Light System made by EYE GRAPHICS CO., LTD. was used for the irradiation with UV light. Next, a VA device was prepared by laminating polarizing plates on both sides outside the cell such that polarization directions thereof were perpendicular to each other. Presence or absence of an abnormal domain in a change of contrast when a voltage of 5 V was applied or released (ON or OFF) to the VA device was observed by visual observation. On the above occasion, a case where no light leakage was observed during voltage OFF to show a white display in a driving region during voltage application, and no light leakage was observed from regions other than the driving region was taken as "good" in the vertical liquid crystal alignment properties, and a case where light leakage was observed was taken as "bad" in the vertical liquid crystal alignment properties.

TABLE 1

|  | Post-Addition Composition number | Compound (1) or Compound (7) | | Compound (2) | | Vertical Liquid Crystal Alignment Properties |
| --- | --- | --- | --- | --- | --- | --- |
|  |  | Compound formula number | Addition proportion (wt %) | Compound formula number | Addition proportion (wt %) |  |
| Example 24 | PLC-A-2 | 1-1-1-1 | 2.00 | 2-1-1-1 | 0.50 | Good |
| Example 25 | PLC-A-5 | 1-1-1-1 | 5.00 | 2-1-1-1 | 0.50 | Good |
| Comparative Example 19 | PLC-A-9 | 7 | 2.00 | 2-1-1-1 | 0.50 | Good |
| Comparative Example 20 | PLC-A-12 | 7 | 5.00 | 2-1-1-1 | 0.50 | Good |

Table 7 shows that the liquid crystal compositions using alignment control compound (1-1-1-1) for alignment film-less use according to the invention have good vertical liquid crystal alignment properties in a manner similar to the liquid crystal compositions using known alignment control compound (7) for alignment film-less use.

INDUSTRIAL APPLICABILITY

The invention provides a liquid crystal composition that contains an alignment control material having high compatibility, is excellent in alignment regulation force and polymerization reactivity, and satisfies at least one of characteristics such as a high maximum temperature, a low minimum temperature, a small viscosity, a suitable optical anisotropy, a large negative dielectric anisotropy and a large specific resistance. Further, a liquid crystal display device including such a composition has characteristics such as a small image persistence, a short response time, a low threshold voltage, a large voltage holding ratio, a large contrast ratio and a long service life, and thus can be widely used for a liquid crystal projector, a liquid crystal television and so forth.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The invention claimed is:

1. A liquid crystal composition, containing at least one compound selected from the group consisting of compounds represented by formula (1) as a first component and at least one compound selected from the group consisting of compounds represented by formula (2) as a second component:

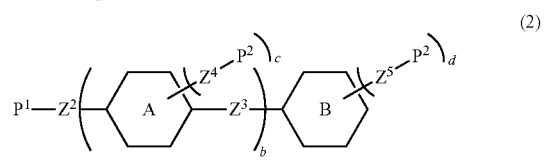

wherein in formula (1), $R^1$ is straight alkyl having 2 to 25 carbons or branched alkyl having 3 to 25 carbons, and in the alkyl, at least one —CH$_2$— may be replaced by —O—, —COO—, —OCO— or —OCOO—, at least one —CH$_2$—CH$_2$— may be replaced by —CH=CH— or —C≡C—, and in the groups, at least one hydrogen may be replaced by halogen; L is a group selected from the group consisting of divalent groups represented by formula (L-1) to formula (L-3);

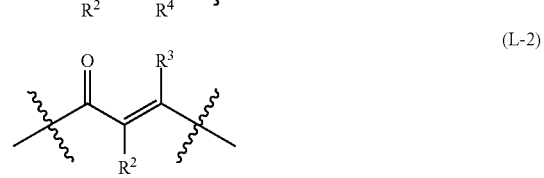

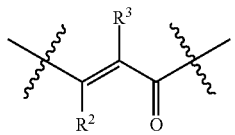
(L-3)

wherein in formula (L-1) to formula (L-3), $R^2$, $R^3$, $R^4$ and $R^5$ are independently hydrogen, fluorine, methyl, ethyl or trifluoromethyl;

in formula (1), $Z^1$ is a single bond or alkylene having 1 to 10 carbons, and in the alkylene, at least one —CH$_2$— may be replaced by —O—, —COO—, —OCO— or —OCOO—, at least one —CH$_2$—CH$_2$— may be replaced by —CH=CH— or —C≡C—, and at least one hydrogen may be replaced by halogen; X is —H, —OH, —OR$^6$, —COOH, —COOR$^6$, —NH$_2$, —NHR$^6$, —NR$^6_2$, —SH, —SR$^6$, —S—SR$^6$ or a group derived from a heterocycle containing at least one —NH— group and having 3 to 20 carbons, and in the heterocycle, at least one hydrogen may be replaced by halogen;

$R^6$ is alkyl having 1 to 6 carbons; and a is 1, 2 or 3;

in formula (2), ring A is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring B is cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $P^1$, $P^2$ and $P^3$ are independently a polymerizable group; $Z^2$, $Z^4$ and $Z^5$ are independently a single bond or alkylene having 1 to 10 carbons, and in the alkylene, at least one —CH$_2$— may be replaced by —O—, —COO—, —COO— or —OCOO—, at least one —CH$_2$—CH$_2$— may be replaced by —CH=CH— or —C≡C—, and in the groups, at least one hydrogen may be replaced by fluorine or chlorine; $Z^3$ is a single bond or alkylene having 1 to 10 carbons, and in the alkylene, at least one —CH$_2$— may be replaced by —O—, —CO—, —COO— or —OCO—, at least one —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine; b is 0, 1, 2 or 3; and c and d are independently 0, 1, 2 or 3.

2. The liquid crystal composition of claim 1, wherein the second component is at least one compound selected from the group consisting of compounds represented by formula (2-1):

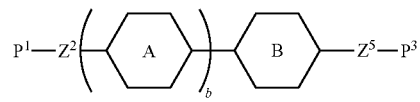
(2-1)

in formula (1), $R^1$ is straight alkyl having 2 to 25 carbons or branched alkyl having 3 to 25 carbons, and in the alkyl, at least one —CH$_2$— may be replaced by —O—, and at least one hydrogen may be replaced by halogen; L is a group selected from the group consisting of divalent groups represented by formula (L-1) to formula (L-3);

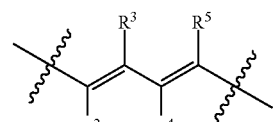
(L-1)

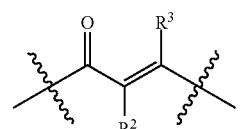
(L-2)

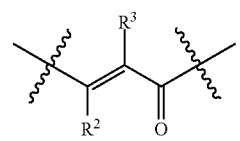
(L-3)

wherein in formula (L-1) to formula (L-3), $R^2$, $R^3$, $R^4$ and $R^5$ are independently hydrogen, fluorine or methyl; $Z^1$ is a single bond or alkylene having 1 to 6 carbons, and in the alkylene, at least one —CH$_2$— may be replaced by —O—, and at least one hydrogen may be replaced by halogen; X is —H, —OH, —OR$^6$, —COOH, —COOR$^6$, —NH$_2$, —NHR$^6$, —NR$^6_2$, —SH, —SR$^6$ or —S—SR$^6$; $R^6$ is alkyl having 1 to 6 carbons; and a is 1 or 2;

in formula (2-1), ring A and ring B are independently 1,4-cyclohexylene, 1,4-cyclohexenylene, 1,4-phenylene, naphthalene-1,4-diyl, naphthalene-1,5-diyl or naphthalene-2,6-diyl, and in the rings, at least one hydrogen may be replaced by halogen, alkyl having 1 to 3 carbons, or alkyl having 1 to 3 carbons in which at least one hydrogen is replaced by halogen; $Z^2$ and $Z^5$ are independently a single bond or alkylene having 1 to 4 carbons, and in the alkylene, at least one —CH$_2$— may be replaced by —O—, —COO—, —OCO— or —OCOO—, at least one —CH$_2$—CH$_2$— may be replaced by —CH=CH— or —C≡C—, and at least one hydrogen may be replaced by halogen; $P^1$ and $P^3$ are independently a group selected from the group consisting of groups represented by formula (P-1) to formula (P-6);

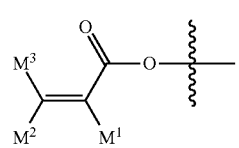
(P-1)

-continued

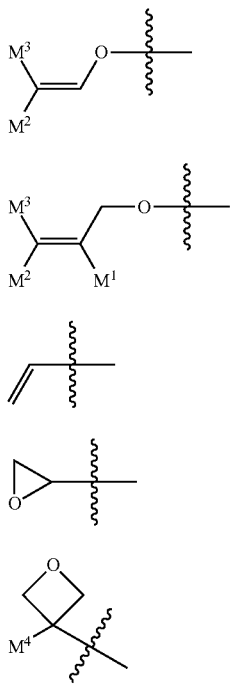

(P-2)

(P-3)

(P-4)

(P-5)

(P-6)

wherein in formula (P-1) to formula (P-3), $M^1$, $M^2$ and $M^3$ are independently hydrogen, fluorine, alkyl having 1 to 5 carbons, or alkyl having 1 to 5 carbons in which at least one hydrogen is replaced by halogen; in formula (P-6), $M^4$ is hydrogen, methyl, ethyl or propyl; when both $P^1$ and $P^3$ are a group represented by formula (P-4), at least one of $Z^2$ and $Z^5$ is alkylene in which at least one —$CH_2$— is replaced by —O—, —COO—, —OCO— or —OCOO—; and b is 0, 1 or 2.

3. The liquid crystal composition of claim 1, wherein the first component is at least one compound selected from the group consisting of compounds represented by formula (1-1), the second component is at least one compound selected from the group consisting of compounds represented by formula (2-1):

$$X-Z^1-L-R^1 \quad (1\text{-}1)$$

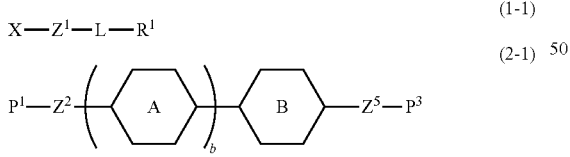

in formula (1-1), R' is straight alkyl having 4 to 20 carbons, and in the alkyl, at least one —$CH_2$— may be replaced by —O—, and at least one hydrogen may be replaced by halogen; $Z^1$ is a single bond or alkylene having 1 to 4 carbons, and in the alkylene, at least one —$CH_2$— may be replaced by —O—, and at least one hydrogen may be replaced by halogen; X is —OH, —COOH, —$NH_2$, —$NHR^6$, —SH, —$SR^6$ or —S—$SR^6$; $R^6$ is alkyl having 1 to 6 carbons; and L is a group selected from the group consisting of divalent groups represented by formula (L-1-1) to formula (L-3-1);

(L-1-1)

(L-2-1)

(L-3-1)

in formula (2-1), $P^1$ and $P^2$ are independently a group selected from the group consisting of groups represented by formula (P-1) and formula (P-5);

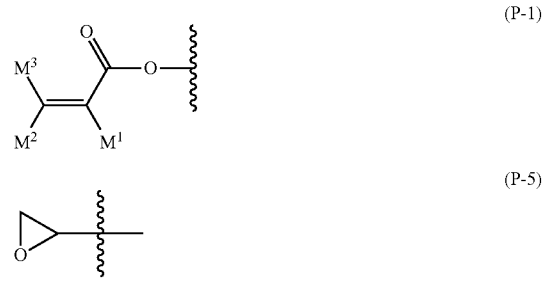

(P-1)

(P-5)

and in formula (P-1), $M^1$ and $M^2$ are independently hydrogen, fluorine, methyl or trifluoromethyl, and $M^3$ is hydrogen;

$Z^2$ and $Z^5$ are independently a single bond or alkylene having 1 to 4 carbons, and in the alkylene, at least one —$CH_2$— may be replaced by —O—, —COO—, —COO— or —OCOO—, and at least one —$CH_2$—$CH_2$— may be replaced by —CH=CH— or —C≡C—; ring A and ring B are independently 1,4-cyclohexylene, 1,4-phenylene, naphthalene-1,4-diyl, naphthalene-1,5-diyl or naphthalene-2,6-diyl, and in the rings, at least one hydrogen may be replaced by halogen, alkyl having 1 to 3 carbons, or alkyl having 1 to 3 carbons in which at least one hydrogen is replaced by halogen; and b is 0, 1 or 2.

4. The liquid crystal composition of claim 1, wherein the first component is at least one compound selected from the group consisting of compounds represented by formula (1-1-1), the second component is at least one compound selected from the group consisting of compounds represented by formula (2-1-1):

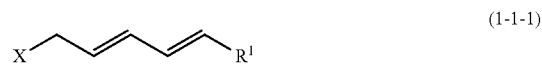

(1-1-1)

-continued (2-1-1)

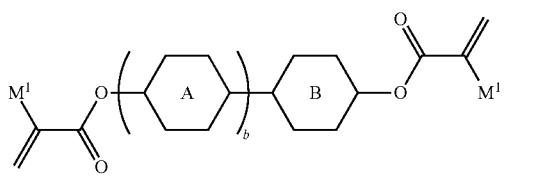

in formula (1-1-1), R' is straight alkyl having 4 to 20 carbons, and in the alkyl, at least one —CH$_2$— may be replaced by —O—; and X is —OH or —COOH;

and in formula (2-1-1), M$^1$ is hydrogen, methyl or trifluoromethyl; ring A and ring B are independently 1,4-phenylene or naphthalene-2,6-diyl, and in the rings, at least one hydrogen may be replaced by halogen, alkyl having 1 to 3 carbons, or alkyl having 1 to 3 carbons in which at least one hydrogen is replaced by halogen; and b is 0, 1 or 2.

5. The liquid crystal composition of claim 1, wherein a proportion of the first component is in a range of 0.05 wt % to 10 wt %, and a proportion of the second component is in a range of 0.03 wt % to 10 wt %, based on a weight of the liquid crystal composition.

6. The liquid crystal composition of claim 1, further containing at least one compound selected from the group consisting of compounds represented by formula (3) as a third component:

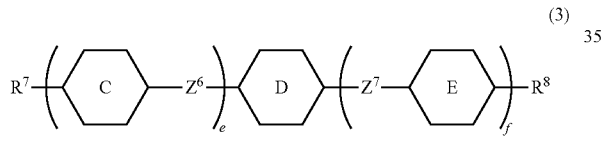

(3)

wherein in formula (3), R$^7$ and R$^8$ are independently alkyl having 1 to 12 carbons, alkoxy having 1 to 12 carbons, alkenyl having 2 to 12 carbons or alkenyloxy having 2 to 12 carbons; ring c and ring E are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Z$^6$ and Z$^7$ are independently a single bond, —CH$_2$CH$_2$—, —CH$_2$O—, —OCH$_2$—, —COO— or —OCO—; e is 1, 2 or 3; and f is 0 or 1, and the sum of e and f is 3 or less.

7. The liquid crystal composition of claim 6, wherein the third component is at least one compound selected from the group consisting of compounds represented by formula (3-1) to formula (3-19):

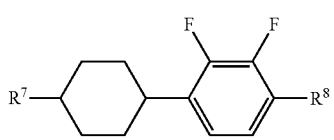

(3-1)

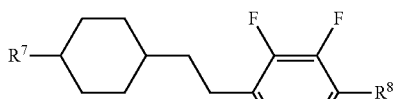

(3-2)

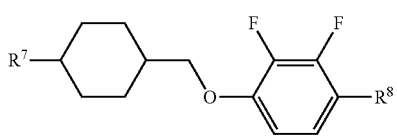

(3-3)

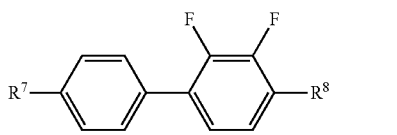

(3-4)

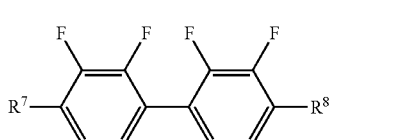

(3-5)

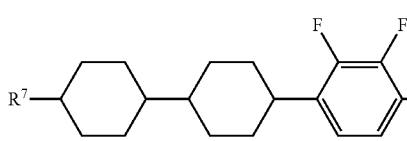

(3-6)

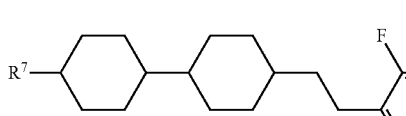

(3-7)

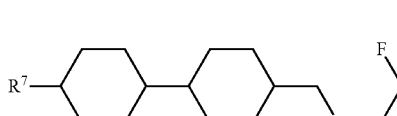

(3-8)

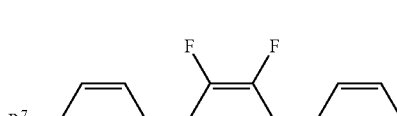

(3-9)

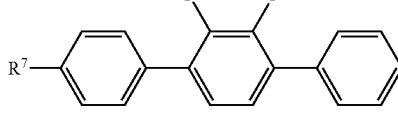

(3-10)

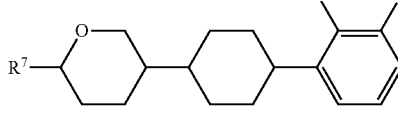

(3-11)

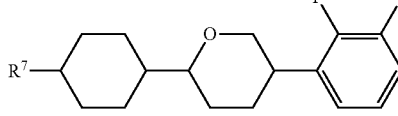

(3-12)

-continued

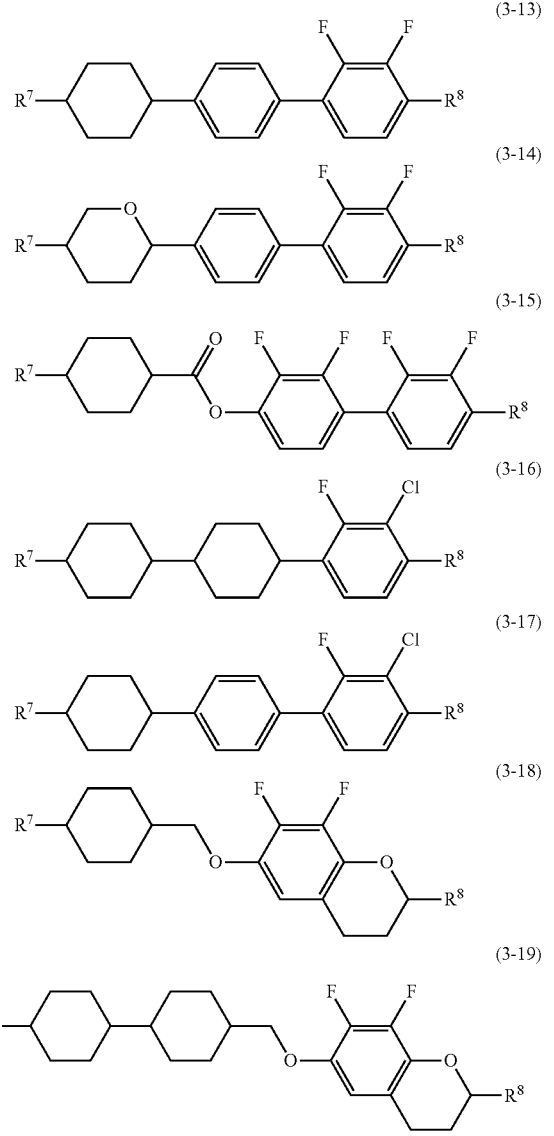

wherein in formula (3-1) to formula (3-19), $R^7$ and $R^8$ are independently alkyl having 1 to 12 carbons, alkoxy having 1 to 12 carbons or alkenyl having 2 to 12 carbons.

8. The liquid crystal composition of claim 6, wherein a proportion of the third component is in a range of 10 wt % to 90 wt % based on a weight of the liquid crystal composition.

9. The liquid crystal composition of claim 6, further containing at least one compound selected from the group consisting of compounds represented by formula (4) as a fourth component:

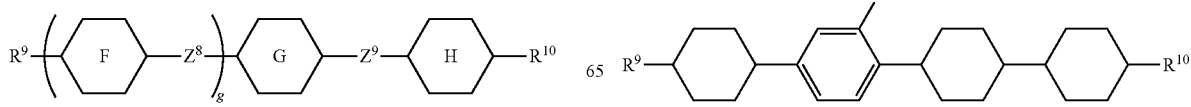

wherein in formula (4), $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring F, ring G and ring H are independently 1,4-cyclohexylene, 1,4-phenylene or 2-fluoro-1,4-phenylene; $Z^8$ and $Z^9$ are independently a single bond, —CH$_2$CH$_2$—, —CH$_2$O—, —OCH$_2$—, —COO— or —OCO—; and g is 0, 1 or 2.

10. The liquid crystal composition of claim 9, wherein the fourth component is at least one compound selected from the group consisting of compounds represented by formula (4-1) to formula (4-13):

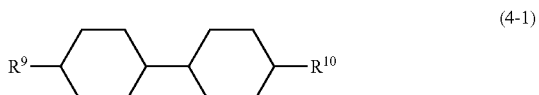

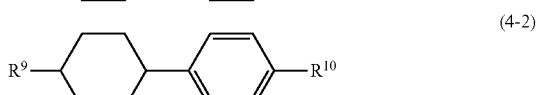

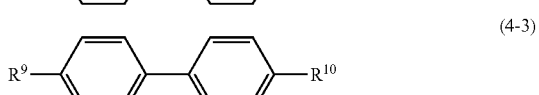

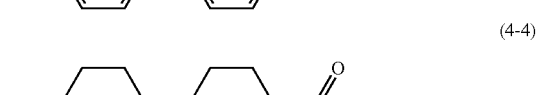

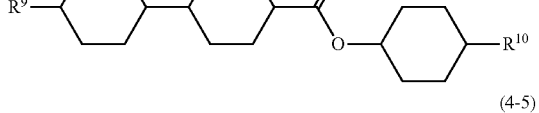

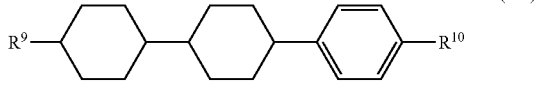

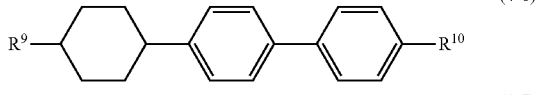

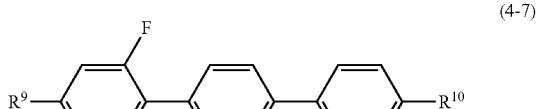

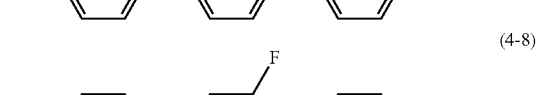

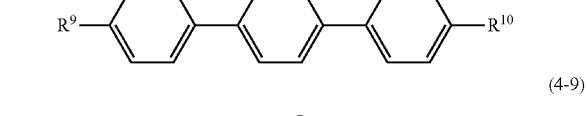

-continued

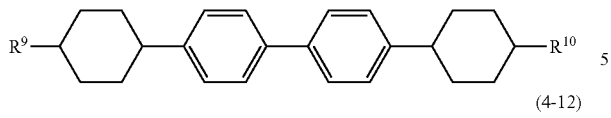
(4-11)

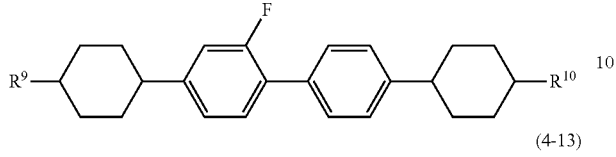
(4-12)

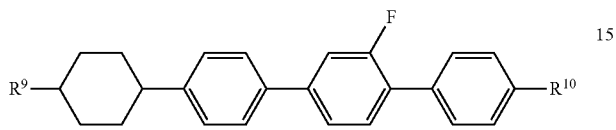
(4-13)

wherein in formula (4-1) to formula (4-13), $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

11. The liquid crystal composition of claim 9, wherein a proportion of the fourth component is in a range of 10 wt % to 90 wt % based on a weight of the liquid crystal composition.

12. The liquid crystal composition of claim 1, further containing a polymerization initiator.

13. The liquid crystal composition of claim 1, further containing a polymerization inhibitor.

14. A liquid crystal display device, including the liquid crystal composition of claim 1.

15. The liquid crystal display device of claim 14, of which an operating mode is an IPS mode, a VA mode, an FFS mode or an FPA mode, and a driving mode is an active matrix mode.

16. A polymer sustained alignment mode liquid crystal display device, including the liquid crystal composition of claim 1, or a composition obtained by polymerizing a polymerizable compound in the liquid crystal composition of claim 1.

17. An alignment film-less mode liquid crystal display device, including the liquid crystal composition of claim 1, or a composition obtained by polymerizing a polymerizable compound in the liquid crystal composition of claim 1.

18. A polymer sustained alignment mode liquid crystal display device, including the liquid crystal composition of claim 9, or a composition obtained by polymerizing a polymerizable compound in the liquid crystal composition of claim 9.

19. An alignment film-less mode liquid crystal display device, including the liquid crystal composition of claim 9, or a composition obtained by polymerizing a polymerizable compound in the liquid crystal composition of claim 9.

20. A liquid crystal composition, containing at least one compound selected from the group consisting of compounds represented by formula (1) as a first component and at least one compound selected from the group consisting of compounds represented by formula (2) as a second component:

(1)

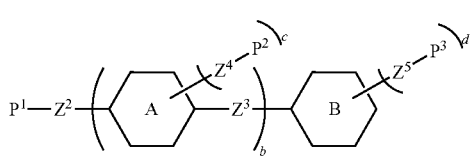
(2)

wherein in formula (1), $R^1$ is straight alkyl having 2 to 25 carbons or branched alkyl having 3 to 25 carbons, and in the alkyl, at least one —$CH_2$— may be replaced by —O—, —OCO—, —COO— or —OCOO—, at least one —$CH_2$—$CH_2$— may be replaced by —CH=CH— or —C≡C—, and in the groups, at least one hydrogen may be replaced by halogen; L is a group selected from the group consisting of divalent groups represented by formula (L-1) to formula (L-3);

(L-1)

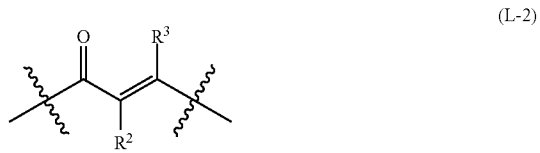
(L-2)

(L-3)

wherein in formula (L-1) to formula (L-3), $R^2$, $R^3$, $R^4$ and $R^5$ are independently hydrogen, fluorine, methyl, ethyl or trifluoromethyl;

in formula (1), $Z^1$ is a single bond or alkylene having 1 to 10 carbons, and in the alkylene, at least one —$CH_2$— may be replaced by —O—, —COO—, —COO— or —OCOO—, at least one —$CH_2$—$CH_2$— may be replaced by —CH=CH— or —C≡C—, and at least one hydrogen may be replaced by halogen; X is —H, —OH, —$OR^6$, —COOH, —$COOR^6$, —SH, —$SR^6$, —S—$SR^6$ or a group derived from a heterocycle containing at least one —NH— group and having 3 to 20 carbons, and in the heterocycle, at least one hydrogen may be replaced by halogen; $R^6$ is alkyl having 1 to 6 carbons; and a is 1, 2 or 3;

in formula (2), ring A is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring B is cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $P^1$, $P^2$ and $P^3$ are independently a polymerizable group; $Z^2$, $Z^4$ and $Z^5$ are independently a single bond or alkylene having 1 to 10 carbons, and in the alkylene, at least one —$CH_2$— may be replaced by —O—, —COO—, —COO— or —OCOO—, at least one —$CH_2$—$CH_2$— may be replaced by —CH=CH— or —C≡C—, and in the groups, at least one hydrogen may be replaced by fluorine or chlorine; $Z^3$ is a single bond or alkylene having 1 to 10 carbons, and in the alkylene, at least one —$CH_2$— may be replaced by —O—, —CO—, —COO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; b is 0, 1, 2 or 3; and c and d are independently 0, 1, 2 or 3.

* * * * *